(12) United States Patent
Hehn et al.

(10) Patent No.: US 12,175,701 B2
(45) Date of Patent: Dec. 24, 2024

(54) METHOD AND ASSEMBLY FOR CREATING A LANDMARK MAP

(71) Applicant: Verity AG, Zürich (CH)

(72) Inventors: Markus Hehn, Zürich (CH); Lino Widmer, Zürich (CH)

(73) Assignee: VERITY AG, Zürich (CH)

( * ) Notice: Subject to any disclaimer, the term of this patent is extended or adjusted under 35 U.S.C. 154(b) by 0 days.

(21) Appl. No.: 17/768,351

(22) PCT Filed: Oct. 15, 2020

(86) PCT No.: PCT/IB2020/059699
§ 371 (c)(1),
(2) Date: Apr. 12, 2022

(87) PCT Pub. No.: WO2021/074840
PCT Pub. Date: Apr. 22, 2021

(65) Prior Publication Data
US 2024/0212190 A1   Jun. 27, 2024

Related U.S. Application Data

(60) Provisional application No. 62/915,664, filed on Oct. 16, 2019.

(51) Int. Cl.
*G06T 7/70* (2017.01)
*G06T 7/579* (2017.01)
(Continued)

(52) U.S. Cl.
CPC ............... *G06T 7/70* (2017.01); *G06T 7/579* (2017.01); *G06T 7/80* (2017.01); *G06V 10/44* (2022.01); *G06T 2207/30244* (2013.01)

(58) Field of Classification Search
CPC .. G06T 7/70; G06T 7/579; G06T 7/80; G06T 2207/30244; G06T 7/337; G06T 7/38; G06T 7/74; G06V 10/44
See application file for complete search history.

(56) References Cited

U.S. PATENT DOCUMENTS

2021/0183080 A1* 6/2021 Hoiem .................... G06T 19/20

OTHER PUBLICATIONS

"Keyframe-based monocular SLAM: design, survey, and future directions" to Younes et al. , 26 pages, Jul. 2, 2016 (Year: 2016).*

(Continued)

*Primary Examiner* — Christopher Wait
(74) *Attorney, Agent, or Firm* — BLANK ROME LLP

(57) ABSTRACT

According to the present invention there is provide a method of creating a landmark map comprising the steps of: capturing a plurality of frame using a camera, each frame comprising an image; assigning an image number which denotes the order in which each frame was taken; extracting features from all the images in the captured frames; assigning a distinct identifier to each respective feature which was extracted from the image belonging to the frame which was first captured; for each image belonging to the respective frames which was captured after the first frame was captured, carrying out the following steps: (i) computing a distance between, the location of each respective extracted feature in that image, and the location of each respective feature extracted from image belonging to a previously captured frame; and (ii) determining if said computed distance is less than, a predefined threshold distance; and if the computed distance is not less than said predefined threshold distance then assign that extracted feature the same identifier as is assigned to the extracted feature in the image belonging to the previously captured frame; if the computed distance is greater than the predefined threshold distance, then assign a new identifier to the extracted feature; providing a list of features which comprises image numbers which denotes each of the captured frames; for each respective image number the identifiers which denote the features which were extracted from the image belonging to that frame; and for each identifier the coordinates which represent the location of the extracted feature in that image; carrying out structure- (Continued)

from-motion followed by repeated landmark representation merging and bundle adjustment, using the list of features, so as to create a landmark map. There is further provided an assembly having a processor which is configured to carry out said method of creating a landmark map.

29 Claims, 8 Drawing Sheets

(51) Int. Cl.
*G06T 7/80* (2017.01)
*G06V 10/44* (2022.01)

(56) References Cited

OTHER PUBLICATIONS

International Search Report and Written Opinion for PCT/IB2020/059699, dated Jan. 25, 2021, 13 pages.
G. Younes, et al., "Keyframe-based Monocular SLAM: Design, Survey, and Future Directions", Cornell University Library, Ithaca, NY, Jul. 2, 2016, 26 pgs.
Seok-Wun Ha, et al., "Multiple Object Tracking using SIFT Features and Location matching", International Journal of Smart Home, vol. 5, No. 4, Oct. 2011, 10 pgs.

* cited by examiner

METHOD AND ASSEMBLY FOR CREATING A LANDMARK MAP

RELATED APPLICATIONS

This application is a national phase of PCT/IB2020/059699, filed on Oct. 15, 2020, which claims priority to U.S. Provisional Application No. 62/915,664, filed on Oct. 16, 2019. The contents of these applications are hereby incorporated by reference in their entirety.

FIELD OF INVENTION

The present invention generally relates to method and assembly for creating a landmark map; and in particular relates to method and assembly for creating a landmark map of a given environment equipped with similar looking or identical landmarks.

BACKGROUND

One of the biggest challenges of localizing indoors is that unlike the outdoor spaces, GNSS (Global Navigation Satellite Systems) is not reliable due to signal attenuation and multi-path effects. Existing RF localization technologies for indoor and outdoor spaces also struggle with signal attenuation and multi-path effects limiting the usability in complex environments, for instance, in the presence of a significant amount of metal.

One such localization system in the prior art is optical. The optical localization system extracts information from camera images. The location of the object of which the pose is to be determined can then be computed using triangulation techniques after relating the coordinates of features in the two-dimensional camera image to a three-dimensional ray on which the landmark lies. The relation between image coordinates and three-dimensional ray is typically captured in a combination of first-principle camera models (such as pinhole or fisheye camera models) and calibrated distortion models (typically capturing lens characteristics, mounting tolerances, and other deviations from the first-principle model).

In the optical localization system, the camera can be rigidly mounted outside the object and observing the motion of the object ("outside-in tracking"), or the camera can be mounted on the object itself observing the apparent motion of the environment ("inside-out tracking"). While outside-in tracking localization systems typically determine the location of the object relative to the known locations of the cameras, inside-out tracking systems like SLAM (Simultaneous Localization And Mapping) typically generate a map of landmarks. The map is expressed in an unknown coordinate system unless the location of some of the landmarks are known or if the initial pose of the camera is known. In both cases, some error will accumulate as the map is expanded away from the initial field of view of the camera or from the landmarks with known location. The potential for propagating errors is a problem for applications where the location information must be referred to external information, for example to display the location of the object in a predefined map, to relate it to the location of another such object, or when the location is used to guide the object to a location known in an external coordinate system.

A significant challenge of optical systems is the extraction of information from the camera image for tracking purposes. For outside-in systems, this entails recognizing the object to be tracked in the image. In inside-out systems, it typically entails extracting "good" landmarks and recognizing them in consecutive images (for example, using scale-invariant feature transform (SIFT) to detect and annotate features). This is complicated by illuminance routinely varying by many orders of magnitude and the reflectivity of surfaces additionally varying by orders of magnitude. For example, full daylight is about 10,000 lux while full moon is only 0.1 lux. In contrast to this, a single-exposure image taken by an image sensor typically only has 2-3 orders of magnitude of dynamic range (e.g. a 10-bit sensor providing 1024 discrete measurement steps of incident light). This makes it difficult to correctly configure the image sensor sensitivity and exposure time, and additionally makes it difficult to recognize landmarks from image to image (especially when camera settings change between images). This severely limits the robustness of optical systems in difficult lighting conditions.

In some instances optical localization systems reduce the impact of varying lighting conditions by:
  Adding illuminance to the scene by using torches or strobes. This technique reduces the required dynamic range by increasing the lower limit of the scene illuminance.
  Adding high-contrast landmarks (that is, areas of differing reflectance) to the scene. In the case of outside-in systems this is often combined with strobes in the form of (retro-) reflectors attached to the tracked object; in the case of inside-out systems this often takes the form of high-contrast wall decorations, carpets, etc.
  Moving out of the visible-light spectrum into the IR or UV spectra. The non-visible-light illuminance can usually be controlled more easily in indoor spaces because there is no need to adjust it to human preferences. This is typically combined with torches or strobes to add a controlled amount of illuminance.

Outside-in optical localization systems scale very poorly to larger localization systems because at every point, the object must be seen by several cameras in order to triangulate the 3D position of the object. Especially for large spaces where only few objects are tracked this is economically not viable.

The present invention aims to mitigate one or more of the disadvantages associated with indoor localization systems, specifically related to the creation of a map of landmarks when those landmarks are indistinguishable.

Existing photogrammetric approaches rely on feature extraction to assign certain descriptors (e.g. SIFT descriptor) to each feature, in addition to the position of the feature on the sensor, that allow matching the features in different images by comparing these descriptors using feature matching. It should be noted that a "feature" in an image is a "projection of landmark". Feature matching, also referred to as the correspondence problem, is the process of matching features over different images. The goal of feature matching is to assign, in a plurality of different images, the same landmark identifiers to features that are the projection of the same landmark, and to assign differing landmark identifiers to features in said plurality of different images that are the projection of different landmarks. If, by some measure of distance, the descriptors assigned to two features in different images are closer than a certain threshold, the two features are assumed to be projections of the same landmark, and accordingly the same identifier is assigned to both features.

This approach cannot be used to create a map of landmarks when the landmarks in question are similar looking or identical to one another; when the landmarks in question are similar looking or identical to one another then projection of these landmarks (i.e. the "features") which appear in different images are indistinguishable (landmarks have very similar physical properties, such as shape, size, color, or reflectivity). Accordingly features in a plurality of images, which are actually projections of different landmarks, may erroneously be assigned the same identifiers. Furthermore descriptors which are assigned to features in a plurality of image are a function of the appearance of the feature in the images; since the appearance of features, which are the projection of similar or identical landmarks, in the image are indistinguishable, some descriptors which are assigned to different features in the plurality of images are indistinguishable; in other words descriptors which are assigned to different features (i.e. features which are the projection of different landmarks) are similar or identical; accordingly, the descriptors which are assigned to features in the plurality of images are not sufficiently different from each other to identify which landmark each feature is a projection of. In this situation, the ability to distinguish landmarks based on feature descriptors is extremely limited; and as a result, with existing photogrammetric techniques it is not possible to achieve sufficiently accurate feature matching over a series of images.

SUMMARY OF INVENTION

According to the present invention there is provided a method having the steps recited in claims 1 and 15.

In the preferred embodiment there is provided a method for creating a landmark map of a given environment which is equipped with similar looking or identical landmarks, by matching features which appear in a series of image frames by using the position which those features appear on an image sensor, and by performing a photogrammetric reconstruction which involves applying multiple iterations of a bundle adjustment step. A landmark map of a given environment is needed for numerous applications, including, but not limited to, 3D reconstruction, navigation, augmented reality, and motion capture.

There is further provided an assembly having a processor which can carry out the method recited in claims 1 and 15.

The dependent claims outline favorable, non-essential, features of the invention.

BRIEF DESCRIPTION OF DRAWINGS

Exemplary embodiments of the present invention will be described, with reference to the following drawings, in which.

DETAILED DESCRIPTION

Figure 1:
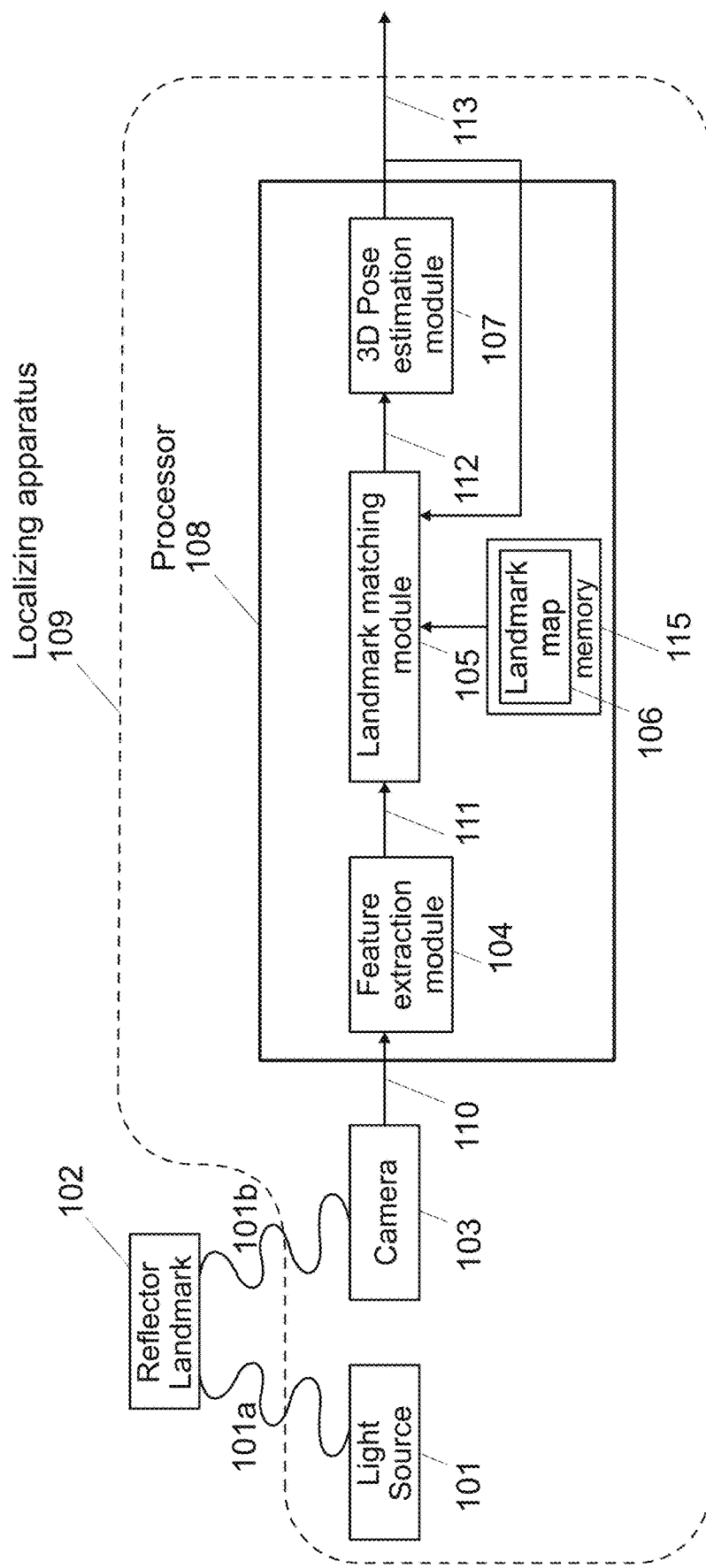
FIG. 1 is an illustrative representation of an assembly according to an embodiment of the present invention.

An image is comprised of at least one or more of pixel intensities, each corresponding to one or multiple of the one or more pixels. Said one or more pixel intensities are typically ordered in an array wherein each element of the array corresponds to the location of the corresponding pixel of an image sensor. The location is typically expressed by a two-dimensional position in the pixel coordinate frame. Typically, the origin of the pixel coordinate frame is at a corner of the image sensor, with the two axes pointing along the edges of the image sensor. The coordinates in the pixel coordinate frame can be expressed in pixel counts or in distance.

A camera is a sensor system that at least captures and outputs one or more frames or a series of frames and comprises at least an image sensor, wherein an image sensor is a sensor that captures and outputs images and comprises one or more pixels. Typically, the one or more pixels are arranged on a planar grid (typically rectangular). The camera may further comprise a mechanical shutter to control exposure.

In some embodiments, the camera further comprises one or more optics to alter the frequency spectrum or direction of incoming light. For example, a lens may be used to focus light onto the image sensor, a filter may be used to reduce transmission of light with certain wavelengths to the image sensor, a mirror may be used to deflect light onto or away from the image sensor. The optics may affect all pixels (e.g. a lens) or individual pixels (e.g. a Bayer array).

In some embodiments, the camera further comprises control circuitry at least connected to the image sensor to adjust settings related to taking images that may include some or all of exposure time and gain. In some embodiments, the camera further comprises control circuitry connected to other components of the camera to adjust other settings related to taking images. For example, said control circuitry may be connected to one or more actuators that are connected to one or more optics and said control circuitry may thereby adjust arrangement of optics, aperture size, etc. In some embodiments, said control circuitry is also configured to read the pixel intensities from the image sensor and to combine the pixel intensities to images. In some embodiments, said control circuitry further processes the images by adjusting the pixel intensities according to a predefined rule (e.g. to achieve better white balance).

In some embodiments, the exposure time of the image sensor can be set by sending a signal to the image sensor and/or mechanical shutter. In some embodiments, the exposure time is fixed and set before operation.

In some embodiments, the camera further comprises optics that are selected or designed such that projected landmarks are more easily distinguishable from other features. For example, if landmarks are known or designed to emit or reflect (or otherwise generate or redirect) light with a specific frequency or in a specific band of frequencies, the camera may be outfitted with a band-pass filter whose passband is selected to include at least part of the frequency of said emitted light such that said light appears significantly brighter in the image than light generated or redirected by other light sources.

A pixel measures the amount of incident light arriving at said pixel and comprises at least a photosensitive material and electric circuitry, wherein the photosensitive material produces an electric signal if excited by incident light, and wherein said electric signal may then be converted to a pixel intensity.

A frame is comprised of at least an image. In some embodiments, the frame further comprises image meta information together with the image. For example, image meta information may include camera settings (such as exposure time, conversion gain, or applied corrections), or a timestamp of when the image was taken (or more precisely, when exposure has started and/or ended). The frame rate is the frequency at which a camera captures and outputs consecutive frames.

A pixel intensity is a value indicative of the amount of light that has arrived at a pixel in a given amount of time, herein referred to as the exposure time.

The collection of directions from which light can arrive at a pixel will hereafter be referred to as light cone. In some embodiments, a light cone may be associated with a single direction computed from said collection of directions, for example by taking the average of said collection of directions.

Some example image sensors include those that are based on metal-oxide-semiconductor (MOS) technology, including the charge-coupled device (CCD) and the active pixel sensor (CMOS sensor), in complementary MOS (CMOS) or N-type MOS (NMOS or Live MOS) technologies.

Typically (for rectangular image sensors), the placement and number of the one or more pixels is described by the resolution: An example resolution is W×H where W is an integer describing the number of pixels along one side of the rectangular sensor and H is an integer describing the number of pixels along the other side of the rectangular sensor.

An angle of arrival (AoA) is at least one value describing the direction at which light arrives relative to an object. In some embodiments, the AoA comprises two angles, e.g. azimuth and elevation with respect to the object. In some embodiments, the direction of a light cone may be expressed by an AoA instead of the direction of the light cone, in which case the location of the pixel corresponding to said light cone may be associated with said AoA and the pixel value corresponding to said pixel is a measure of the amount of light arriving from said AoA.

Camera calibration parameters is a set of mappings, values and/or models describing properties of the camera, including at least a camera model. In some embodiments the camera calibration parameters further include an undistortion mapping. In some embodiments camera calibration parameters may further include the resolution of the image sensor. In some embodiments, the camera calibration parameters further include the pose of the camera coordinate system with respect to another coordinate system fixed to the localizing apparatus.

A camera model is a set of mappings, values and/or equations describing the relation between the location of a pixel in the image and the direction or collection of directions of its corresponding light cone. In some embodiments, the camera model is a mapping storing for each pixel location a corresponding direction of the light cone corresponding to said pixel location. In some embodiments, the camera model is a set of equations describing a mapping from a direction of incoming light to a pixel location and/or from a pixel location to a direction of incoming light. Typically, said set of equations and values contains at least coordinates of the principal point and the focal length of the camera. A camera model may for example be determined by any well-known means of camera calibration.

An undistortion mapping is a set of values and/or equations determined to compensate for nonidealities (e.g. optical aberration such as defocus, distortion, chromatic aberration, etc.) of the image sensor or optics (if applicable).

A localizing apparatus is an assembly comprising at least a camera. In some embodiments the localizing apparatus further comprises a processor, a light source, and/or additional sensors.

A feature is a point or area of an image that satisfies one or more properties which make it recognizable. Some examples of such properties include the color, brightness, shape, other similar characteristics, or combinations thereof. In some embodiments said one or more properties make the feature highly distinctive relative to a neighborhood surrounding the feature. For example, a bright area (i.e. an area of high pixel intensity) on an image may be surrounded by a neighborhood of low pixel intensity, and the bright area is therefore recognizable as a feature.

A feature description comprises at least the position of the feature within the image. In some embodiments, the feature description further comprises a descriptor.

A descriptor is a collection of parameters describing the appearance of a feature. Thus, a descriptor may comprise any information about a feature except its position within the image. Specific examples of descriptors include
  the area, shape or color of the feature
  a generic, geometric descriptor of the feature, as for example the SIFT descriptor, the MOPS descriptor or the GLOH descriptor
  a message, code, or similar information encoded in the feature, as for example the message encoded in a QR code
  a semantic classification of the feature, i.e. whether it is the projection of a chair, a car or a table In the present disclosure the terms feature descriptor and descriptor are used interchangeably.

A landmark is a point, object, or surface in space that can be recognized as a feature in at least some of the images taken of said landmark. In some embodiments, the landmark reflects light, in which case the landmark is referred to as reflector landmark. In some embodiments, the landmark emits light, in which case the landmark is referred to as active landmark.

Reflector landmarks are preferably placed at fixed locations within the environment and illuminated by one or more light sources.

In some embodiments, the reflector landmark is retroreflective causing the reflection of light received from a light source to be reflected back to said light source in a concentrated fashion. Retroreflectors commonly consist of glass beads or cube corner microprisms. A retroreflector is typically characterized by its coefficient of retroreflection, which may be specified as a function of the angle of incident light relative to the surface of the retroreflector and/or the angle between light source and camera. If a camera is placed close to said light source, said retro-reflective surface of the reflector landmark will appear significantly brighter on the image than reflections from diffuse reflectors at the same distance.

In some embodiments, the shape of the reflector landmark is such that the appearance of its projection on an image collected by a camera is the same regardless of the relative orientation between said reflector and said camera. In some embodiments, the shape of the reflector landmark is such that the area of projection of said reflector landmark on an image collected by a camera is the same regardless of the relative orientation between said reflector landmark and said camera. In some embodiments, the shape of the retroreflector is such that the area or shape of the retroreflector varies with the relative orientation between said reflector landmark and said camera.

In some embodiments the landmarks, are active landmarks; an active landmark is a landmark which is configured to emit light when a predefined condition has been satisfied (or in response to receiving a predefined stimulus). For example in one implementation, an active landmark may include a photosensor, control circuitry, and a light source; the photosensor detects the amount of light which is incident on the active landmark (preferable the light which is incident on the photosensor is light which is emitted from a light source which is on the localizing apparatus); if the amount of light which is incident on the active landmark is above a predefined threshold level (i.e. the 'predefined condition'), then the control circuitry controls the light source of the active landmark to emit light. The light source may be configured to emit light which has predefined properties e.g. light having a predefined wavelength, or light which is within a predefined wavelength range (e.g. Infrared light); advantageously this allows to distinguish light emitted by the light source on the active landmark from light coming from other light sources.

A landmark representation is a description of a landmark, comprising at least an estimate of the position of the landmark. In some embodiments said landmark representation is a 3D position of the landmark expressed in the external coordinate frame. In some embodiments, said 3D position is the center of mass of the landmark. In some embodiments, the landmark representation may include further information such as Uncertainty metric in the estimate of the position of the landmark, such as a covariance matrix;
one or more descriptions of the shape of the landmark;
size or dimensions of the landmark;
orientation of the landmark;
uncertainty metric of the orientation of the landmark, such as a covariance matrix;
reflective properties such as reflectivity of the landmark, wherein the reflectivity may be further expressed as a function of the angle of arrival, the intensity, and/or the spectral power distribution of the incident light;
a list of distinctive 3D positions of the landmark (such as corners of the landmark if applicable),
one or more semantic classification of the landmark, i.e. whether it is a chair, a car or a table, or
combinations of the above A landmark identifier is a symbol or value uniquely identifying a landmark representation. In some embodiments said landmark identifier is an integer number. A landmark identifier may be assigned to a feature, indicating that said feature is believed to be a projection of the landmark associated with the landmark representation identified by said landmark identifier.

Photogrammetry is the method of obtaining information about the geometry of a 3D environment from 2D projections of said environment, usually images. This information includes but is not limited to the position of certain landmarks in the 3D environment.

Feature matching, also referred to as the correspondence problem, is the process of matching features over different images. The goal of feature matching is to assign, in a plurality of different images, the same landmark identifiers to features that are the projection of the same landmark, and to assign differing landmark identifiers to features in said plurality of different images that are the projection of different landmarks. If, by some measure of distance, the descriptors assigned to two features in different images are closer than a certain threshold, the two features are assumed to be projections of the same landmark, and accordingly the same identifier is assigned to both features.

A landmark map is a list of one or more landmark representations. In some embodiments, the landmark map further contains for at least one of the one or more landmark representations a corresponding landmark identifier.

A light source is a system or device that receives input energy and that emits light, wherein light refers to any electromagnetic radiation. In a preferred embodiment, a measurable amount of the energy of the emitted light is emitted within the frequency spectrum of ultra-violet, visible and infra-red light. Examples of light sources include incandescent light bulbs, halogen lamps, light-emitting diodes (LEDs), fluorescent lamps (compact fluorescent lights, fluorescent tube lights), gas discharge lamps, flames, lasers, chemo-luminescent materials, fluorescent materials, and phosphorescent materials (such as e.g. zinc sulphide or strontium aluminate).

In some embodiments the light source is powered by any of a battery, external electrical power supply, gas, fuel, solar cell, or other power sources or combinations thereof.

In some embodiments, the light source further comprises control circuitry configured to change the intensity and/or frequency of the light emitted by the light source over time. In some embodiments, said control circuitry is further configured to receive signals indicating the target intensity of the light emitted by the light source. In some embodiments, said control circuitry is further connected to a clock allowing the control circuitry to control the intensity of the light emitted by the light source according to a preprogramed schedule. In some embodiments, said clock is synchronized with other clocks.

Light sources may emit light in all directions (omnidirectionally), or only in certain directions. The directional properties of a light source are described by its radiation pattern, which describes the intensity of light emitted in different directions. In the present disclosure, the term light source and strobe may be used interchangeably.

A feature extraction module is a module that takes as input at least one frame. The module identifies, within at least one image contained in the at least one frame, features and their respective positions in the at least one image (in some embodiments, the module further determines their respective descriptors). The module outputs for each image within which it identified features a list of feature descriptions.

In some embodiments, the feature extraction module is configured to identify features in the image without any prior knowledge of the properties of landmarks (such as size, dimensions, orientation, etc.). In said embodiment, the feature extraction module is configured to select features in the image frame which have certain predefined properties. Preferably, the predefined property is for the feature to have a large gradient of brightness in two orthogonal directions.

In some embodiments, the feature extraction module is configured to identify features in the image having prior knowledge of the appearance of landmarks (such as size, dimensions, orientation, etc.). In said embodiment, the feature extraction module identifies features in the image that match the appearance of landmark, for example, the extraction of fiducials such as QR codes.

A feature-to-landmark match comprises at least a feature description and a landmark representation. A feature-to-landmark match represents the belief that the feature described by the feature description contained in the feature-to-landmark match is a projection of the landmark described by the landmark representation contained in the feature-to-landmark match. In some embodiments, the feature-to-landmark match comprises a landmark identifier instead of a landmark representation.

In the present disclosure, a feature-to-landmark match is said to be a 'true feature-to-landmark match' or 'true match', if the feature described by the feature description contained in the feature-to-landmark match is indeed a projection of the landmark described the landmark representation contained in the feature-to-landmark match. Conversely, if the feature described by the feature description contained in the feature-to-landmark match is not a projection of the landmark described the landmark representation contained in the feature-to-landmark match, then the feature-to-landmark match is said to be a 'false feature-to-landmark match' or 'false match'.

In some embodiments, the feature-to-landmark match may include further information such as an indicator whether a feature description or a landmark representation was successfully matched (i.e. it was successfully determined that the feature described by the feature description is a projection of the landmark described by landmark representation) or whether the feature-to-landmark match is assumed to be a true match or false match with high certainty. It should be understood that the same information may be conveyed implicitly by forming a feature-to-landmark match that only contains a feature description and an empty or invalid landmark representation, or by forming a feature-to-landmark match that only contains a landmark representation and an empty or invalid feature description. In some embodiments, said indicator is not binary but a number representing the likelihood of the feature-to-landmark match being a true (or false) match.

A feature-to-landmark matching module is a module that takes as input a list of feature descriptions and a landmark map. The module:

identifies which features are projections of landmarks in the landmark map, and which are not. The features that are projections of landmarks in the landmark map are called inlier features, while the features that are not projections of landmarks in the landmark map are called outlier features for the inlier features, identifies of which landmark of the landmark map each inlier feature is the projection of.

The two operations may be performed as separate steps or simultaneously. The output of the feature-to-landmark matching module is at least a list of feature-to-landmark matches, wherein the list of feature-to-landmark matches is formed as follows:

for each inlier feature: a feature-to-landmark match is formed from the landmark representation (or landmark identifier) of the landmark (of the landmark map) where said inlier feature was identified to be the projection of and the feature description of said inlier feature.

The list of feature-to-landmark matches is formed from the resulting one or more feature-to-landmark matches for each inlier feature In some embodiments, the feature-to-landmark module outputs an augmented list of feature-to-landmark matches, which contains, in addition the feature-to-landmark matches of the inlier features, for each outlier feature: a feature-to-landmark match having the feature description of the outlier feature and an empty or invalid landmark representation.

In some embodiments, the feature-to-landmark matching module further receives one or more estimates of the 3D pose of the localizing apparatus. Said one or more estimates of the 3D pose may be used as one or more priors to simplify the two operations that the feature-to-landmark matching module carries out to create the list of feature-to-landmark matches.

A 3D pose estimation module is a module that takes as input a list of feature-to-landmark matches. The module performs a computation that determines an estimate of at least the position or orientation of the localizing apparatus with respect to an external coordinate system. In a preferred embodiment, the module determines an estimate of the 3D pose with respect to an external coordinate system. The output of the 3D pose estimation module is at least the estimate of the position or orientation of the localizing apparatus (or a at least the 3D pose estimate of the localizing apparatus in said preferred embodiment).

In some embodiments, specifically if the list of feature-to-landmark matches contains feature-to-landmark matches that contain landmark identifiers instead of landmark representations, the 3D pose estimation module requires the same landmark map provided to the feature-to-landmark matching module to perform its computations because the 3D pose estimation requires the landmark representations that are identified by the landmark identifiers.

A 3D pose comprises 6 degrees of freedom describing a 3D position and 3D orientation. The terms '3D pose' and 'pose' will be used interchangeably hereafter.

A processor is a device or electronic circuit that is capable to carry out operations required by the feature extraction module, feature-to-landmark matching module, and the 3D pose estimation module. In some embodiments the processer may further comprise at least one memory, which may temporarily or persistently store information relevant to carry out operations on the processor. For example, the memory may store (predefined) parameters such as one or more camera calibrations and/or one or more landmark maps.

Additional sensor data refers to data provided by any of the group of limit switches, air pressure sensors, accelerometers, gyroscopes, magnetometers, optical flow sensors, encoders, photodetectors, laser or sonar range finders, radar, thermometers, hygrometers, bumpers, chemical sensors, electromagnetic sensors, air flow sensors and relative airspeed sensors, ultra sound sensors, microphones, radio sensors, and time-of-flight sensors.

DETAILED DESCRIPTION OF DRAWINGS

FIG. 1 is an illustrative representation of an assembly 100 according to an example embodiment of the present invention, which can be used to determine the location of a localizing apparatus 109. The assembly 100 comprises at least one light source 101; at least one reflector landmark 102; a camera 103; a feature extraction module 104; a feature-to-landmark matching module 105; a landmark map 106; a 3D pose estimation module 107; and a processor 108.

The localizing apparatus 109 comprises the processor 108, the at least one light source 101, and the camera 103.

The at least one light source 101 emits light 101a. In this embodiment the light source 101 is preferably physically attached to camera 103.

The at least one reflector landmark 102 is configured to reflect light 101a. Thus returning reflected light 101b to the camera 103. In another embodiment, the at least one reflector landmark 102 may be at least one active landmark wherein an active landmark is a landmark that emits light.

In another embodiment, the at least one reflector landmark 102 may be at least one active reflector landmark wherein an active reflector landmark is an active landmark that emits light in response to a predefined stimulus (for example the active landmarks may emit light which has a predefined property (e.g. a predefined wavelength) in response to receiving light from the light source 101).

The camera 103 captures one or more frames wherein each captured frame comprises at least an image, wherein said image is formed by reading out one or more pixel intensities measured by the corresponding one or more pixels during a predefined exposure time, wherein the pixels are exposed to the reflected light 101b reflected by the reflector landmark 102. The camera 103 outputs the one or more frames 110.

The feature extraction module 104 is operably connected to the camera 103 and receives one or more frames 110 from the camera 103. The feature extraction module 104 outputs for each of the one or more frames 110 which it receives from the camera 103, one or more lists of feature descriptions 111.

The landmark map 106 is a list of one or more landmark representations; most preferably the landmark map 106 is stored in a memory 115 of the assembly 100 (the memory 115 may be part of the processor 108; in other words the processor 108 may comprise the memory 115). The landmark map 106 of a given environment may for example be obtained with SLAM or photogrammetry, however, it is also possible to take the opposite approach of designing a landmark map, and then shaping the environment according to the map. According to the present invention there is provided a method of creating a landmark map 106, as will be described below; the method of creating a landmark map 106 is preferably executed prior to operating the assembly 100.

The feature-to-landmark matching module 105 is operably connected to the memory 115 containing the landmark map 106, the feature extraction module 104 and the 3D pose estimation module 107. The feature-to-landmark matching module 105 receives the landmark map 106 from the memory 115, the one or more lists of feature descriptions 111 from the feature extraction module 104, and one or more estimates of the 3D pose of the localizing apparatus 113 from the 3D pose estimation module 107. The feature-to-landmark module 105 computes for each list of the one or more lists of feature descriptions 111 a list of feature-to-landmark matches 112 and outputs the resulting one or more lists of feature-to-landmark matches 112.

The 3D pose estimation module 107 is operably connected to the feature-to-landmark matching module 105; the 3D pose estimation module 107 receives said one or more lists of feature-to-landmark matches 112 from the feature-to-landmark matching module 105. The 3D pose estimation module computes for each of the one or more lists of feature-to-landmark matches 112 an estimate of the 3D pose of the localizing apparatus 109. The 3D pose estimation module 107 outputs the resulting one or more estimates of the 3D pose of the localizing apparatus 113.

The processor 108 comprises the feature extraction module 104, feature-to-landmark matching module 105, and the 3D pose estimation module 107. It should be understood that the system could alternatively comprise a plurality of processors and the modules may be distributed among said plurality of processors (e.g. the system may comprise a first processor which comprise the feature extraction module; a second processor which comprises feature-to-landmark matching module; and a third processor which comprises the module which can estimate the pose of said camera). Importantly, the processor 108 may be configured to carry out a method of creating a landmark map 106 according to the present invention; said method will be described in more detail below. The method of creating a landmark map 106 may also be carried out by a processor, including but not limited to another computing device such as a smart phone, which is separate from the localizing apparatus.

Figure 2:
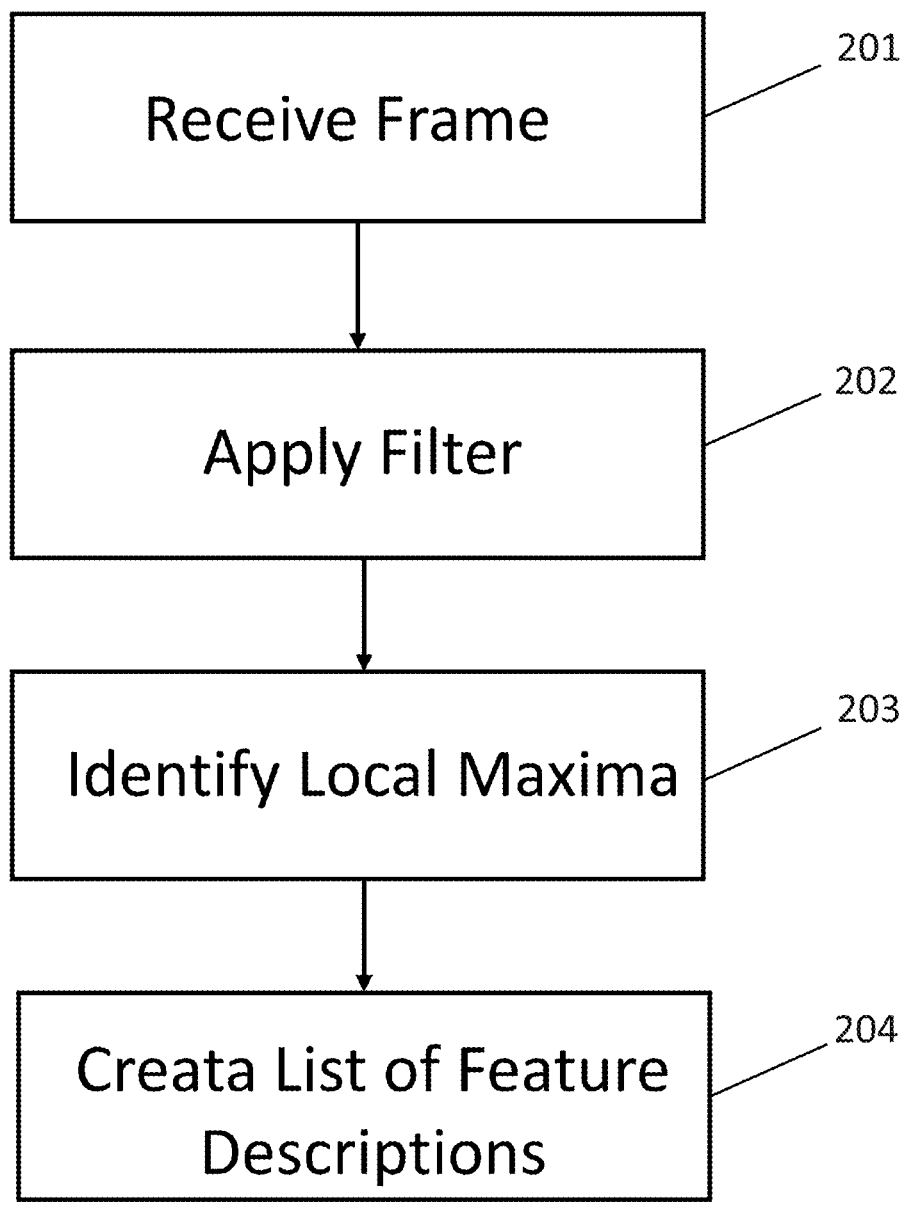
FIG. 2 is a flow chart illustrating the exemplary steps performed by the feature extraction module, belonging to the assembly of FIG. 1, to create a list of feature descriptions.
Figure 3:
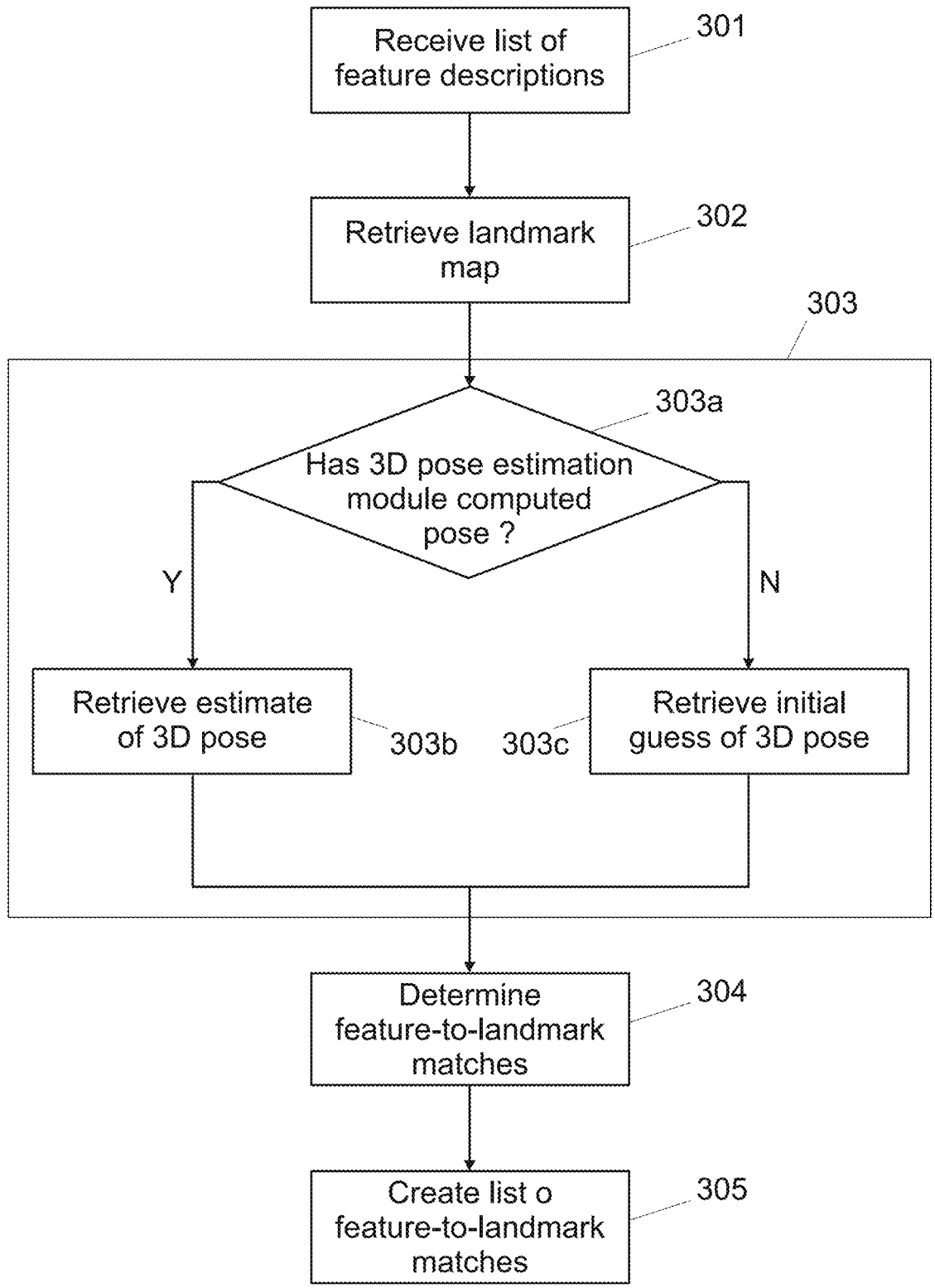
FIG. 3 is a flow chart illustrating the exemplary steps performed by the feature-to-landmark matching module, belonging to the assembly of FIG. 1, to create a list of feature-to-landmark matches for each of the one or more lists of feature descriptions.
Figure 4:
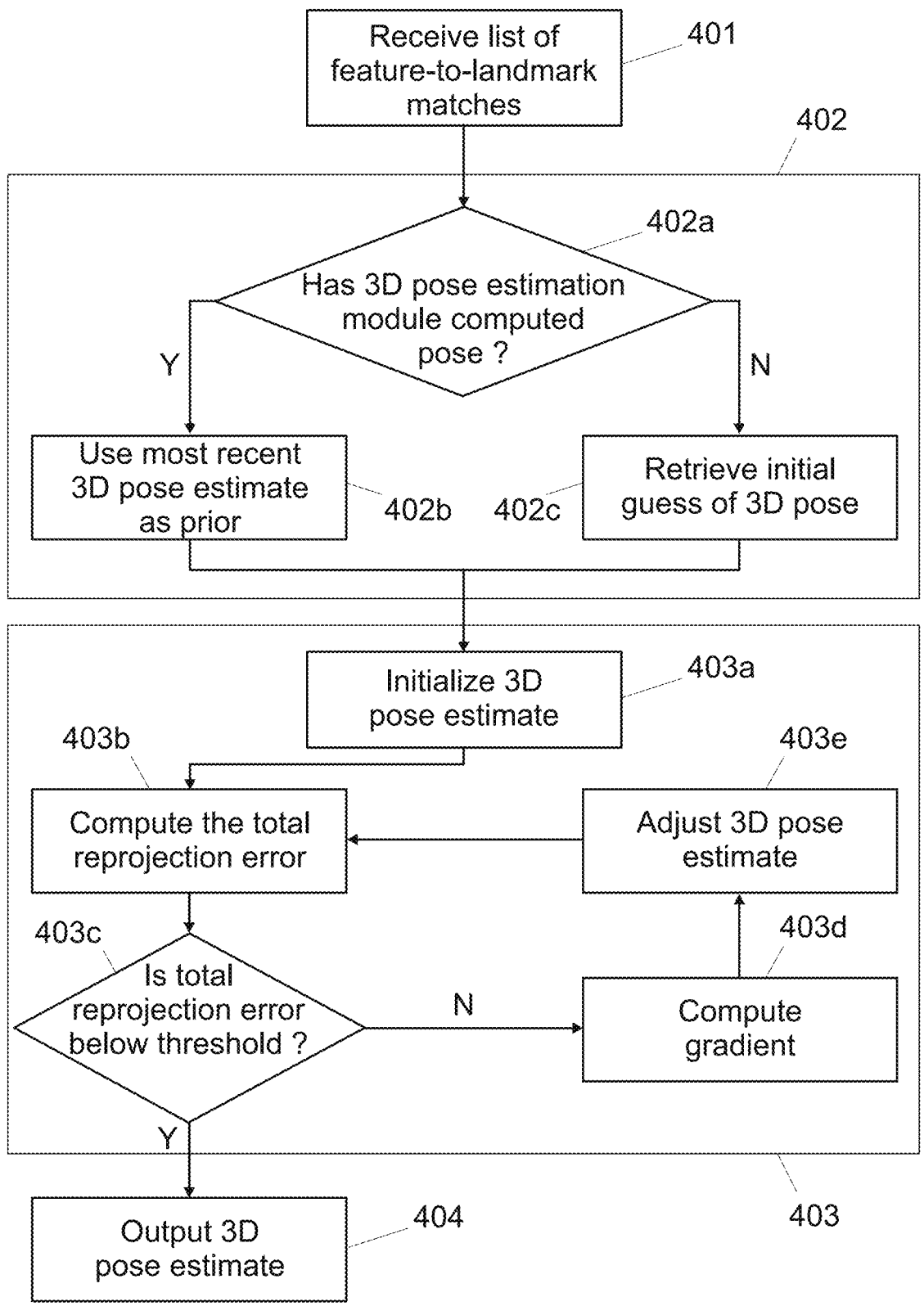
FIG. 4 is a flow chart illustrating the exemplary steps performed by the 3D pose estimation module, belonging to the assembly of FIG. 1, to compute an estimate of the 3D pose of the localizing apparatus using the one or more lists of feature-to-landmark matches.

During the operation of the assembly 100 the following exemplary method may be carried out to determine the location of the localizing apparatus 109:

1. The light source 101 emits light 101a;
2. The emitted light 101a arrives fully or partially at one or more reflector landmarks 102;
3. The reflector landmark(s) 102 reflects the light 101a fully or partially, giving rise to the reflected light 101b;
4. The reflected light 101b arrives fully or partially at the camera 103;
5. The camera 103 captures an image of the scene containing the one or more reflector landmarks 102 (the reflected light 101b being used to generate the image). Pixels of the image sensor of the camera 103 that were exposed to the reflected light 101b will have associated a higher pixel intensity (and thus appear brighter) in the image. The image is stored in a frame. The camera may capture multiple images and store them in one or more frames. The one or more frames 110 are forwarded to the feature extraction module 104,
6. The feature extraction module 104 receives the one or more frames 110 and creates a list of feature descriptions 111 for each of the one or more frames 110 by any suitable means, (e.g. as illustrated in FIG. 2 as will be described in more detail below). The resulting one or more lists of feature descriptions 111 are forwarded to the feature-to-landmark matching module 105.
7. The feature-to-landmark matching module 105 receives the one or more lists of feature descriptions 111, retrieves the landmark map 106 and receives the one or more estimates of the 3D pose of the localizing apparatus 113. If the 3D pose estimation module has not yet computed one or more estimates of the 3D pose of the localizing apparatus 113, the feature-to-landmark matching module 105 instead uses one or more predefined initial guesses of the 3D pose of the localizing apparatus. The feature-to-landmark matching module 105 then creates for each of the one or more lists of feature descriptions 111 a list of feature-to-landmark matches 112 by any suitable means, (e.g. as illustrated in FIG. 3 as will be described in more detail below). The resulting one or more lists of feature-to-landmark matches 112 are then forwarded to the 3D pose estimation module 107.
8. The 3D pose estimation module receives the one or more lists of feature-to-landmark matches 112 and computes an estimate of the 3D pose of the localizing apparatus 113 by any suitable means, (e.g. as illustrated in FIG. 4 as will be described in more detail below). The resulting one or more estimates of the 3D pose of the localizing apparatus 113 are the output by the 3D pose estimation module 107.

It should be understood that above process may be repeated multiple times to determine the location of the localizing apparatus multiple times. Especially if the localizing apparatus is moving, it may be beneficial to run above process repeatedly so as to get the most recent estimate of the location of the localizing apparatus. In some embodiments, the history of estimates of the 3D pose of the localizing apparatus may be of interest, in which case the above process must be executed multiple times. Specifically, for example, if a history of the location of the localizing apparatus is desired to be known at a frequency of once per second, above process could be repeated every second and the resulting estimate of the 3D pose of the localizing apparatus may be stored in a table, wherein each row contains a timestamp of when the process was executed and the corresponding result of the execution of the process (i.e. the 3D pose estimate).

FIG. 2 illustrates an exemplary method how the feature extraction module 104 can create a list of feature descriptions 111 for each of the one or more frames 110; the method comprises the following steps:

1. In step 201, the feature extraction module 104 receives a frame 110 which has been captured by the camera 103.
2. In step 202, the feature extraction module 104 applies a filter to the image contained in the frame, resulting in a filtered image. The filter may be a band-pass filter, a thresholding filter or a high pass filter for example. It should be noted that this step is optional and may be used to improve image quality (wherein image quality may for example be measured by how accurately the position of the feature may be determined in step 203) for subsequent steps. For example, step 202 may reduce image sensor noise, lower high pixel intensities caused by ambient light, or smoothen the image. The filter may be predefined or adapting based on e.g. the sum of the pixel intensities of the image.
3. In step 203, the feature extraction module 104 identifies local maxima in pixel intensity in the filtered image. The position in the image of the local maxima is identified by the feature extraction module 104 as being the position of a feature within the image.
4. In step 204, the feature extraction module then creates a list of feature descriptions wherein each feature description contains at least the position of the feature in the image.

In step 203, local maxima in pixel intensity may for example be identified by a search using gradient ascent: Starting at every point in the image, move along the gradient until the gradient has zero magnitude, this point is either a local minimum or a local maximum. Discard points that have low pixel intensity as local minima.

In yet another embodiment, prior to carrying out step 204, the feature extraction module 104 may, optionally, further carry out a step of selecting a predefined area around of each local maximum and use said area to create a respective feature description, e.g. a vector which comprises information on the appearance of the neighbourhood surrounding the local maximum. Alternatively, the feature extraction module may identify, for each local maximum, the region of surrounding pixels that all have a common predefined property and use said region to create a respective feature description; for example the feature extraction module may derive a description of said region of surrounding pixels that all have a common predefined property by computing relevant geometrical properties, such as the area of the region, the perimeter of the region, or the principal components of the region.

FIG. 3 illustrates an exemplary method how the feature-to-landmark matching module 105 creates for each of the one or more lists of feature descriptions 111 a list of feature-to-landmark matches 112; the method comprises the following steps:

1. In step 301, the feature-to-landmark matching module 105 receives a list of feature descriptions 111 from the feature extraction module 104;
2. In step 302, the feature-to-landmark matching module retrieves a landmark map 106 from the memory 115;
3. In step 303, the feature-to-landmark matching module obtains a prior estimate of the 3D pose of the localizing apparatus. This is achieved as follows
   a. In step 303*a*, the feature-to-landmark matching module determines if the 3D pose estimation module has already computed one or more estimates of the 3D pose of the localizing apparatus. Typically, the 3D pose estimation module will not have computed an estimate of the 3D pose of the localizing apparatus if it is the first time that step 303 is executed. If the feature-to-landmark matching module has determined that the 3D pose estimation module has already computed an estimate of the 3D pose of the localizing apparatus, it proceeds with step 303*b*, otherwise it proceeds with step 303*c*.
   b. In step 303*b*, the feature-to-landmark matching module receives an estimate of the 3D pose of the localizing apparatus from the 3D pose estimation module. Said estimate of the 3D pose of the localizing apparatus will be used as the prior estimate of the 3D pose of the localizing apparatus.
   c. In step 303*c*, the feature-to-landmark matching module retrieves a predefined initial guess of the 3D pose of the localizing apparatus. Said predefined initial guess of the 3D pose will be used as the prior estimate of the 3D pose of the localizing apparatus.
4. In step 304, the feature-to-landmark matching module determines which features in the list of feature descriptions are projections of landmarks of the landmark map (inlier features) and which ones are not (outlier features), and for each of the inlier features, determines of which landmark of the landmark map each inlier feature is the projection of based on the list of feature descriptions, the landmark map, and the prior estimate of the 3D pose of the localizing apparatus. For each pair of feature description and corresponding landmark representation a feature-to-landmark match is created.
5. In step 305, all feature-to-landmark matches are collected in a list of feature-to-landmark matches.

Steps 304 and 305 of this process may for example be implemented as follows. This step is referred to as Step 330 (not shown in FIG. 3).

Compute for each landmark representation of the landmark map, by projecting said landmark representation based on the camera model and the prior estimate of the 3D pose of the localizing apparatus into the pixel coordinate frame, at least the location of where in the image its projection would appear as a feature. Each such pair of landmark representation and said location in the image together form a feature-to-landmark match. The result is a first list of feature-to-landmark matches.

For each of the feature descriptions in the list of feature descriptions 111, determine which of the positions of the features in the first list of feature-to-landmark matches is closest to the position of the feature description (closest may e.g. be smallest Euclidean distance) of the list of feature descriptions 111. Replace the feature description of the first list of feature-to-landmark matches which is closest to the feature description of the list of feature descriptions 111, by the feature description of the list of feature descriptions 111, and consider the corresponding feature-to-landmark match to be a true feature-to-landmark match. Add said true feature-to-landmark match to a second list of feature-to-landmark matches.

Said second list of feature-to-landmark matches is the final list of feature-to-landmark matches that is output by the feature-to-landmark matching module.

In an embodiment where no predetermined initial guess of the 3D pose of the localizing apparatus is available and/or the 3D pose estimation module does not provide an estimate of the 3D pose of the localizing apparatus to the feature-to-landmark matching module, step 303 and 304 of this process may for replaced by the following process:

Within a predefined space, wherein the localizing apparatus is expected to be in (typically the room that contains the landmarks), sample location hypotheses. The result are one or more location hypotheses. This may for example be done on a grid with a fixed distance between nodes, wherein each node is a location hypothesis.

For each location hypothesis, sample orientation hypotheses. In combination with the location hypotheses, this results in one or more 3D pose hypotheses.

For each of the one or more 3D pose hypotheses, execute step 330 treating the 3D pose hypothesis as the prior estimate of the 3D pose of the localizing apparatus, resulting in one or more lists of feature-to-landmark matches.

Select a single list a most appropriate list of feature-to-landmark matches, for example by selecting the list of feature-to-landmark matches which has the smallest error.

FIG. 4 illustrates an exemplary method how the 3D pose estimation module computes an estimate of the 3D pose of the localizing apparatus 113 using the one or more lists of feature-to-landmark matches 112; the method comprises the following steps:

1. In step 401, the 3D pose estimation module receives a list of feature-to-landmark matches
2. In step 402, the 3D pose estimation module obtains a prior estimate of the 3D pose of the localizing apparatus. This is achieved as follows
   a. In step 402a, the 3D pose estimation module determines if it has already computed one or more estimates of the 3D pose of the localizing apparatus. Typically, the 3D pose estimation module will not have computed an estimate of the 3D pose of the localizing apparatus if it is the first time that step 402 is executed. If the 3D pose estimation module has determined that it has already computed an estimate of the 3D pose of the localizing apparatus, it proceeds with step 402b, otherwise it proceeds with step 402c.
   b. In step 402b, the 3D pose estimation module uses the most recent of the one or more estimates of the 3D pose it has computed so far. Said most recent estimate of the 3D pose of the localizing apparatus will be used as the prior estimate of the 3D pose of the localizing apparatus.
   c. In step 402c, the 3D pose estimation module retrieves a predefined initial guess of the 3D pose of the localizing apparatus. Said predefined initial guess of the 3D pose will be used as the prior estimate of the 3D pose of the localizing apparatus.
3. In step 403, the 3D pose estimation module computes an estimate of the pose of the localizing apparatus by minimizing a total reprojection error as follows, using iterative least-squares optimization:
   a. In step 403a, initialize the 3D pose estimate by setting the 3D pose estimate to the prior estimate of the 3D pose of the localizing apparatus.
   b. In step 403b, compute the total reprojection error according to the description below, using the 3D pose estimate and the list of feature-to-landmark matches.
   c. In step 403c, if the total reprojection error is below a predefined threshold, proceed with step 404, otherwise proceed with step 403d.
   d. In step 403d, compute the gradient of the total reprojection error with respect to the 3D pose, evaluated at the 3D pose estimate.
   e. In step 403e, adjust the 3D pose estimate by adding the gradient scaled by a predefined step-size to the 3D pose estimate.
4. In step 404, output the 3D pose estimate.

The total reprojection error may be computed from a 3D pose estimate and a list of feature-to-landmark matches as follows:

For each feature-to-landmark match in the list of feature-to-landmark matches
  compute for each landmark representation in the feature-to-landmark match, by projecting said landmark representation based on the camera model and the 3D pose estimate into the pixel coordinate frame, the location of where in the image its projection would appear as a feature
  compute the Euclidean distance between said location and the position of the feature described by the feature description in the feature-to-landmark match, resulting in a reprojection error corresponding to that feature-to-landmark match Take the sum of each reprojection error computed for each feature-to-landmark match of the list of feature-to-landmark matches to arrive at the total reprojection error In some embodiments, the predefined threshold for the total reprojection error used in step 403c is a tuning parameter that may, for example, be experimentally determined.

It should be understood that the termination criterion used in step 403c, may be replaced by other suitable criteria, for example, by comparing the magnitude of the gradient to a predefined threshold and if it is below the threshold proceed to step 404.

In some embodiments, the 3D pose estimation further computes and provides a metric of confidence, such as e.g. the covariance matrix of the pose or a list of reprojection errors (or an average/median/min/max thereof). An example metric of confidence may be the residual total reprojection error computed in step 403 after the iterative least-square optimization has converged: The higher the residual total reprojection error is, the lower the confidence in the 3D pose estimate computed in step 403.

In some embodiments, step 403 may be replaced by methods to solve the perspective-n-point problem (PnP) known in prior art.

In another embodiment, the 3D pose estimation module may further improve the accuracy and precision of the 3D pose estimate of the localizing apparatus by combining information from multiple frames as follows: The 3D pose estimation may accumulate a plurality of lists of feature-to-landmark matches from multiple feature-to-landmark matching modules and/or from the same feature-to-landmark matching module over time and combine them, for example, by averaging, filtering, recursive estimation, and/or batch optimization. Specifically, for example, if two lists of feature-to-landmark matches are provided, the 3D pose estimation module may merge both lists of feature-to-landmark matches into a single list of feature-to-landmark matches before computing an estimate of the pose of the localizing apparatus according to, for example, step 403 increasing both accuracy and precision of the resulting 3D pose estimate because more information (two instead of one list of feature-to-landmark matches) could be used to determine said 3D pose estimate.

In another embodiment, the 3D pose estimation module further improves the accuracy and precision of the 3D pose estimate of the localizing apparatus by further using additional sensor data. The 3D pose estimation may utilize said additional sensor data using any suitable means of sensor fusion such as (extended) Kalman Filters, complementary filters, particle filters, Luenberger observers or optimization. Specifically, for an example embodiment, if additional sensor data such as measurements of the acceleration and rotational rate of the localizing apparatus is provided by an IMU, said acceleration and rotational rate measurements may be used to predict motion between the reception of two consecutive lists of feature-to-landmark matches. Specifically, in step 402b the accuracy of the prior estimate of the 3D pose of the localizing apparatus may be improved by the following procedure 1. Receiving, at a first time instance, a first list of feature-to-landmark matches and computing a first 3D pose estimate based thereon by any method disclosed herein,
2. Receiving at least one measurement of the acceleration and at least one measurement of the rotational rate of the localizing apparatus,
3. Receiving, at a second time instance, a second list of feature-to-landmark matches,
4. Computing the time difference between the first and second time instance,
5. Integrating at least one measurement of the acceleration two times over the time difference (e.g. according to a forward-Euler integration step) to compute a relative change in the location of the localizing apparatus with respect to the location of the localizing apparatus at the first time instance
6. Integrating the at least one measurement of the rotational rate of the localizing apparatus once over the time difference (e.g. according to a forward-Euler integration step) to compute a relative change in the orientation of the localizing apparatus with respect to the orientation of the localizing apparatus at the first time instance
7. Computing a prior 3D pose estimate by updating the first 3D pose estimate both with the relative change in the location of the localizing apparatus and the relative change in orientation of the localizing apparatus.
8. Computing a second 3D pose estimate based on the prior 3D pose estimate and the second list of feature-to-landmark matches.

In some embodiments, (extended) Kalman Filters, complementary filters, particle filters, Luenberger observers, or any other suitable technique can be used to recursively compute an estimate.

As mentioned the assembly 100 comprises a memory 115 having stored within it a landmark map 106; in a variation the landmark map 106 could be stored externally to the assembly; either way the landmark map 106 is stored in a location such that the processor 108 of the assembly 100 can access the landmark map 106.

Figure 5:
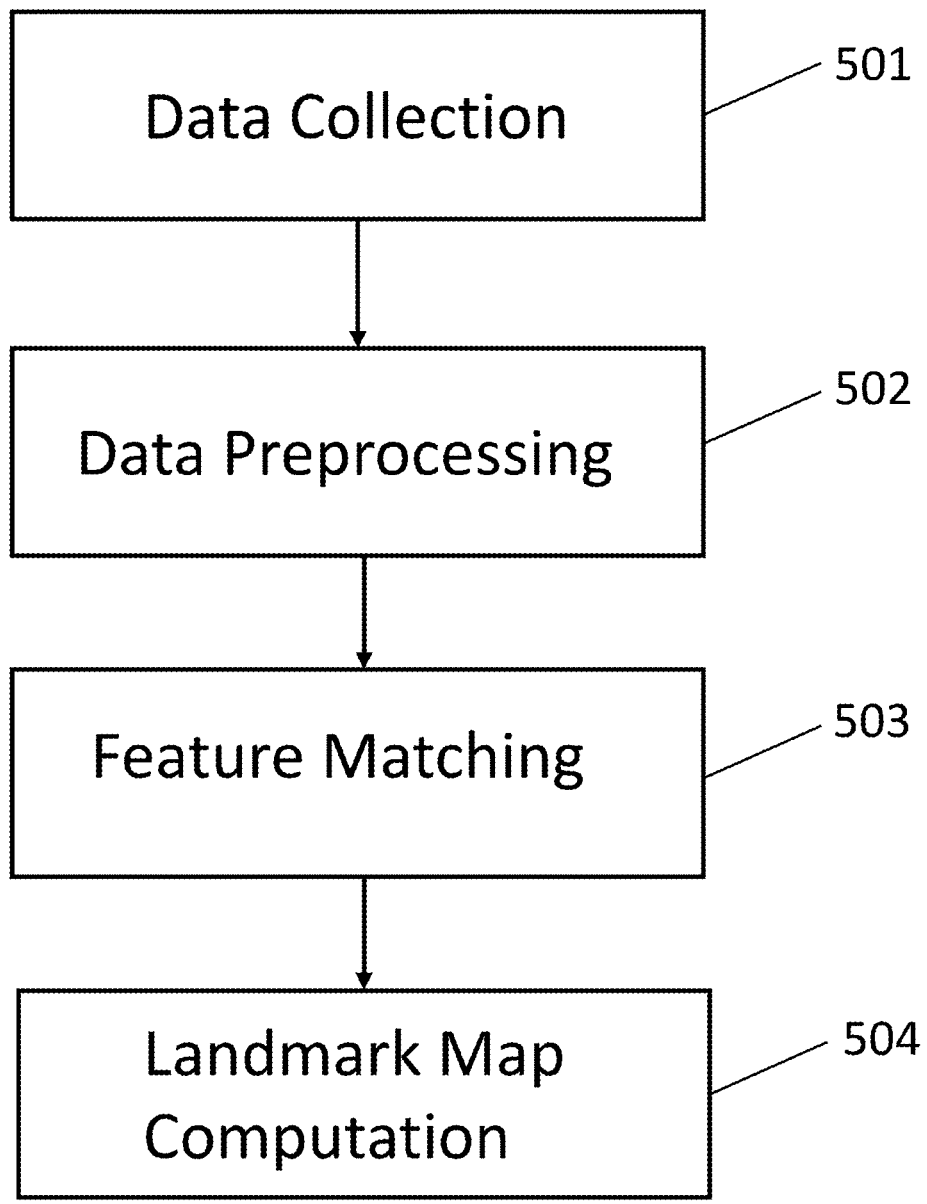
FIG. 5 illustrates an exemplary method regarding how the landmark map may be created according to the invention disclosed herein.
Figure 6:
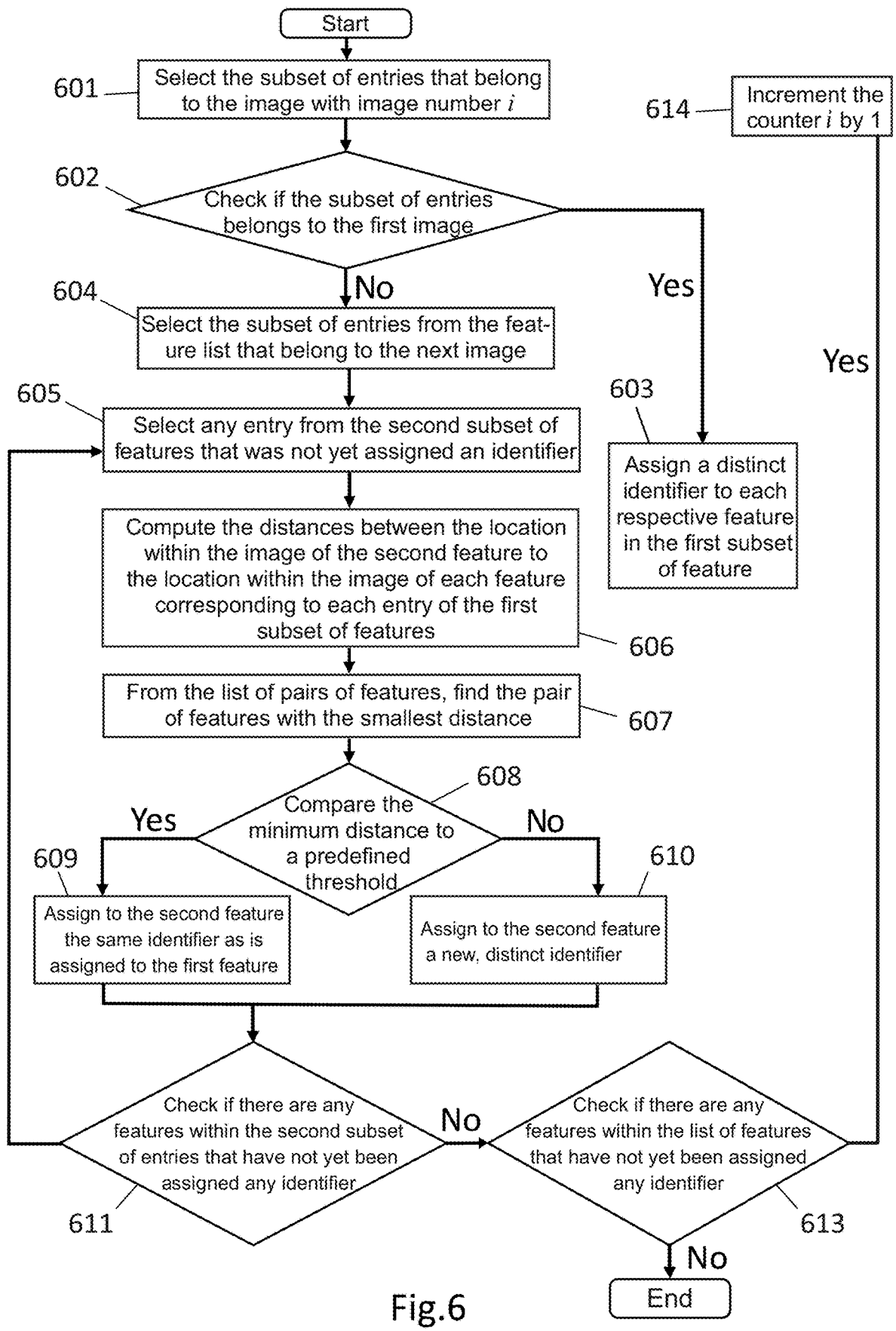
FIG. 6 illustrates an exemplary method that may be implemented by the feature matching step 503 illustrated in FIG. 5.

As mentioned, according to the present invention there is provided a method of creating the landmark map 106. The following is a description of an embodiment of a method of creating a landmark map 106 according to the present invention. Advantageously this method could be used to create a landmark map even when the landmarks whose projections on to the image sensor have indistinguishable feature descriptors. This advantage is achieved because the method uses matching features over a series of images (belonging to captured frame) by using their position on the image sensor, and then preferably, applies multiple iterations of a bundle adjustment step of a photogrammetric procedure. FIG. 5 illustrates an exemplary method how the landmark map 106 may be created according to the invention disclosed herein. The exemplary method proceeds as follows 1. In the data collection step 501, data is collected. Data comprises a plurality of frames 110 captured by the camera 103, each frame comprising a respective image; wherein each of the plurality of frames 110 are captured consecutively (i.e. a first frame is captured; then after capturing the first frame a second frame is captured; then after capturing the second frame a third frame is captured etc.). Each of the frames are assigned an image number which denotes the order in which each frame was captured (e.g. the first frame, which comprises a first image, which is captured is assigned image number '1'; and the second frame which comprises a second image, which is captured is assigned image number '2' etc). Preferably, the camera is moving while capturing the two or more frames. Preferably, one or more landmarks lie within the field of view of the camera when the at least two or more frames are captured and are thus expected to appear as features in some of the images.
2. In the data pre-processing step 502, the data from step 501 is pre-processed. Pre-processing comprises at least the extraction of features from at least two or more of the captured images using any suitable method. An example of such a suitable method is by using the feature extraction module 104. The output of the data pre-processing step 502 is at least a first list of features that contains for every extracted feature its corresponding feature description and the image number from which said feature was extracted from.
3. In the feature matching step 503, features are matched (e.g. as illustrated in FIG. 6 as will be described in more detail below) across the plurality of frames (described as 'feature matching' in the present disclosure). The result of this step is a second list of features that contains for every extracted feature its corresponding feature description, the image number from which said feature was extracted from, and an identifier. It should be noted that an identifier is a numeric value which is assigned to a feature to denote the landmark which that feature is a projection of.

Figure 7:
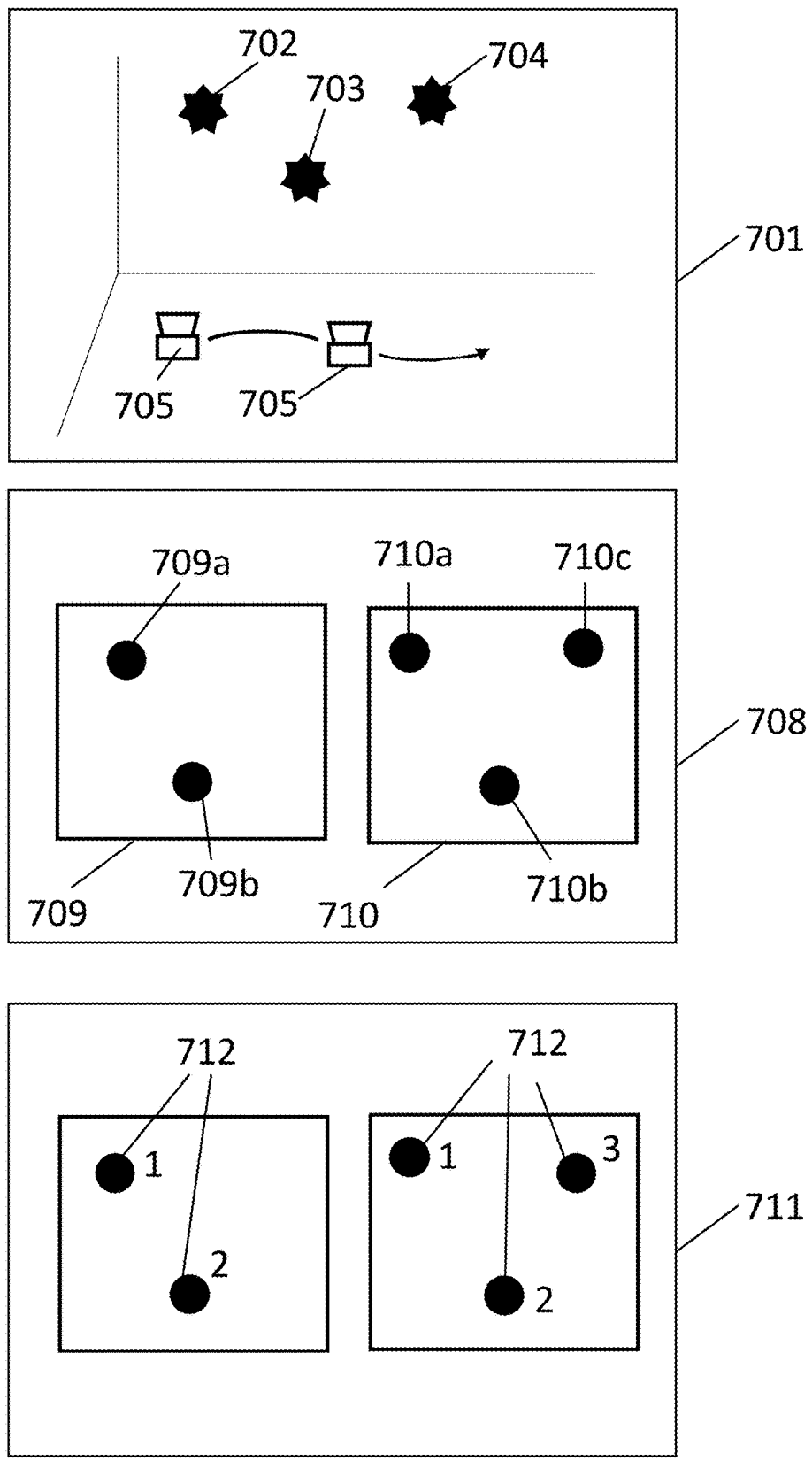
FIG. 7 further illustrates by an example how the method described in steps 601-614 and illustrated in FIG. 6 performs feature matching.

4. In the landmark map computation step 504, a landmark map is computed (e.g. as illustrated in FIG. 7 as will be described in more detail below). The result of this step is the desired landmark map 106.

It should be noted that the method disclosed herein advantageously does not require the feature descriptions to contain a feature descriptor. In other words, the landmarks may be similar or identical and, as a result, feature descriptors corresponding to the landmarks may be similar or identical and therefore cannot be relied on to distinguish features which are projections of different landmarks.

FIG. 6 illustrates an exemplary method that may be implemented by the feature matching step 503 illustrated in FIG. 5. As above mentioned, the feature matching step 503 implements a method for feature matching. The method may proceed as follows:

At the start of the method, a counter i is initialized with the value 1.

In step 601, take as input a list of features that contains for every extracted feature its corresponding feature description and the image number from which said feature was extracted from (referred to the 'first list of features' in the description of FIG. 5). From said list of features, select the subset of entries that belong to the image with image number i. The subset of entries will be referred to as first subset of features.

In step 602, check if the subset of entries belongs to the first image (i.e. i=1). If this is the case, proceed with step 603, otherwise proceed with step 604.

In step 603, assign a distinct identifier to each respective feature in the first subset of features. Assigning an identifier to a feature refers to expanding in a list of features, the entry corresponding to the said feature by a field which contains said identifier.

In step 604, select the subset of entries from the feature list that belong to the next image (i.e. the image with image number i+1). The subset of entries will be referred to as second subset of features.

In step 605, select any entry from the second subset of features that was not yet assigned an identifier (this may for example be done by (pseudo-)random selection). This entry will be referred to as second entry and its corresponding feature will be referred to as second feature.

In step 606, compute the distances (each according to a measure of distance as described below) between the location within the image of the second feature to the location within the image of each feature corresponding to each entry of the first subset of features. This results in a list of pairs of features with their respective distances.

In step 607, from the list of pairs of features, find the pair of features with the smallest distance. This pair of features will be referred to as minimum-distance pair of features. By definition, one of the features contained in the minimum-distance pair of features is the second feature, the other will hereafter be referred to as first feature. The corresponding distance will be referred to as minimum distance.

In step 608, compare the minimum distance to a predefined threshold. If the minimum distance is less than the predefined threshold, proceed with step 609, otherwise proceed with step 610.

In step 609, assign to the second feature the same identifier as is assigned to the first feature.

In step 610, assign to the second feature a new, distinct identifier i.e. an identifier that has previously never been assigned to any feature.

In step 611, check if there are any features within the second subset of entries that have not yet been assigned any identifier. If this condition is true (there are features within the second subset of entries that have not yet been assigned any identifier), proceed with step 605, otherwise, proceed with step 613.

In step 613, check if there are any features within the list of features that have not yet been assigned any identifier. If this condition is true (there are features within the list of features that have not yet been assigned any identifier), proceed with step 614, otherwise, the method is completed and each feature within the list of features has been augmented by a corresponding identifier.

In step 614, increment the counter i by 1.

The measure of distance utilized in step 606 may be any suitable measure of distance. For example, a suitable measure of distance may be the Euclidean distance $$d(F_{p_1}, F_{p_2}) = \|F_{p_1} - F_{p_2}\|,$$

where $F_{p_1}$ is the position a first feature within an image and $F_{p_2}$ is the position of a second feature within an image. For example, if the first feature occupies the x,y coordinates (5 cm, 10 cm) in the image, and the second feature occupies the x,y coordinates (10 cm, 10 cm) in the image, then the distance measure evaluates to '5 cm'.

It should be noted that optionally, additional sensor measurements θ (such as gyroscope measurements or accelerometer measurements) taken by optional sensors attached to the camera 103, that allow estimating the movement of the camera 103, could also be used to compute said measure of distance between features in respective images in different captured frames. In one embodiment, a gyroscope attached to the camera 103 is used to estimate the rotation between two images belonging to two subsequently captured frames by integrating the gyroscope sensor data. The feature positions in a first image, belonging to said first captured frame, can then be transformed according to the estimated camera rotation, and the transformed feature positions can be used to compute said measure of distance.

1) For each respective image belonging to subsequently captured frames (i.e. for each image belonging to a frame which was captured after the first frame was captured) carry out the following steps:
   By executing the exemplary method of FIG. 6, it is clear that two features in subsequently captured images are being assigned the same identifier if they are estimated to be projections of the same landmark, which is the goal of feature matching.

FIG. 7 further illustrates by an example how the method described above and illustrated in FIG. 6 performs feature matching.

Panel 701 illustrates 3 landmarks 702, 703, and 704 which are placed in the environment. During data collection, a camera 103 is moved along a path 707 and captures two frames (each containing one image) from two different poses 705 and 706.

Panel 708 illustrates a first image 709 that belongs to the frame that was captured when the camera was at pose 705, and a second image 710 that belongs to the frame that was captured when the camera was at pose 706. The first image 709 contains two features 709a and 709b. The second image 710 contains three features 710a, 710b, and 710c. The first image is captured prior to the second image.

Panel 711 illustrates which identifiers 712 are assigned to each of the features if the method described above and illustrated in FIG. 6 is applied: Features 709a and 709b are assigned identifier '1' and '2', respectively (in fact, according to step 603 the identifiers could be any value so long as they are unique). Feature 710a is assigned the same identifier as feature 709a (i.e. '1') because the distance between feature 709a and feature 710a is less than a predefined threshold (not illustrated). Similarly, feature 710b is assigned the same identifier as feature 709b (i.e. '2'). Feature 710c is assigned a new identifier (here '3') because there is no feature that has a distance that is less than the predefined threshold.

The landmark computation step 504 may for example be carried out as follows: Structure-from-motion, (well-known in the prior art), is performed on the list of features to create a landmark map 106. Most preferably, the list of features and camera parameters of the camera 103 which captured the plurality of frames, are used in structure-from-motion to create a landmark map 106. In one embodiment, said structure-from-motion comprises a reconstruction initialization step, and an initial bundle adjustment step. The reconstruction initialization step is first carried out, and it is followed by an initial bundle adjustment step, yielding a landmark map 106.

Said landmark map 106 is then further refined by applying a merging step, followed by a bundle adjustment step. Most preferably said merging step and bundle adjustment steps are repeated a plurality of times.

Figure 8:
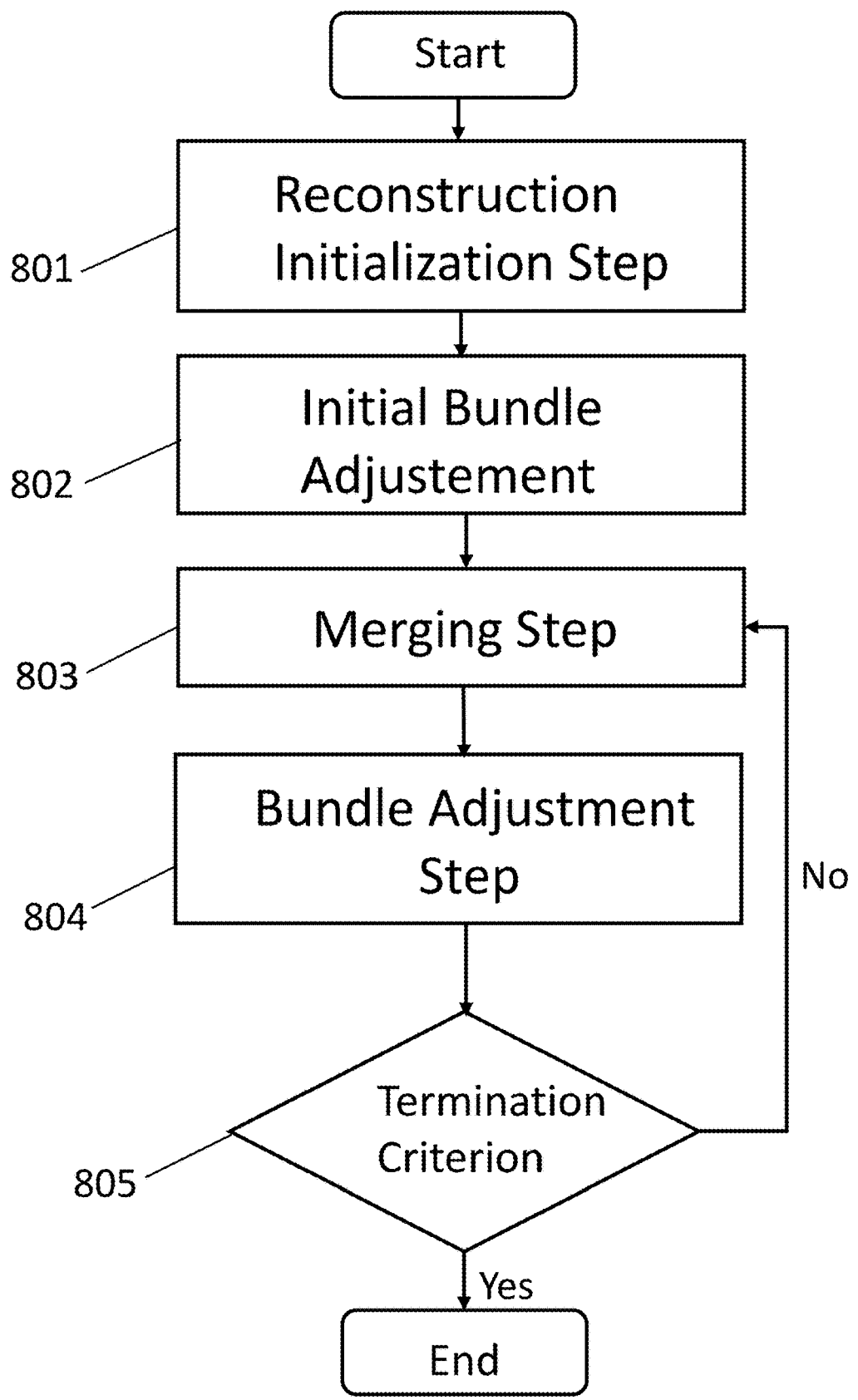
FIG. 8 illustrates an exemplary method that may be implemented by the landmark computation step 504 illustrated in FIG. 5.

FIG. 8 illustrates more specifically an exemplary method that may be implemented by the landmark computation step 504 illustrated in FIG. 5. The method proceeds as follows:
1. In the reconstruction initialization step 801, a landmark map and estimated camera poses are computed based on an input feature list (referred to as 'second list of features' above in step 503 of FIG. 5). An example method to achieve this is described in detail below.
2. In the initial bundle adjustment step 802, the landmark map, the estimated camera poses, and, optionally, the camera parameters are optimized. An example method to achieve this is described in detail below.
3. In the merging step 803, the input feature list is updated such that features (corresponding to entries in the input feature list) that are projections of the same landmark each get assigned the same landmark identifier to yield and updated input feature list. An example method to achieve this is described in detail below.
4. In the bundle adjustment step 804, the landmark map, the estimated camera poses, and, optionally, the camera parameters are optimized based on the updated input feature list.
5. In step 805, a termination criterion is checked. If the termination criterion is fulfilled, the method is complete and the desired landmark map 106 has been computed. Otherwise, proceed with step 803. An example termination criterion is described in detail below.

Reconstruction Initialization Step 801:

The reconstruction initialization step, preferably comprises the steps of:
(i) Estimating respective relative poses of the camera 103 as the camera 103 captured each pair of frames of said respective frames 110 (each frame pair comprising two captured frames). A relative pose for a given pair of frames, e.g. a first frame and a second frame, consists of a relative rotation and a relative translation, which, if applied to a pose of the camera during acquisition of said first frame, rotate and translate said pose of the camera during acquisition of said first frame to a pose of the camera during acquisition of said second frame. In one embodiment, this can be achieved with the five-point algorithm. The five-point algorithm takes as input the coordinates of the features in two images belonging respectively to two captured frames, and their identifiers (the coordinates and the identifiers are extracted from the list of features); and outputs a relative pose between the pose of the camera when it captured the first of two frames, and the pose of the camera when it captured the second of said two frames. The five-point algorithm does this for all of the captured frames; in other words, pairs of frames (each frame pair comprising two captured frames) are input to the five-point algorithm and respective relative poses are output for each pair of frames.

(ii) Estimating respective global orientations, i.e. the orientations with respect to an inertial coordinate frame, of the camera 103 as the camera 103 captured each of said respective frames 110. In one embodiment, this can be achieved with a rotation averaging algorithm such as, for example, L1 iteratively reweighted least squares. The algorithm takes as input relative rotations and an initial guess of the global orientations and computes a refined estimate of the global orientations. In one embodiment, an initial guess of global orientations is computed using a minimum spanning tree of a view graph. In another embodiment, an initial guess of global orientations is obtained from additional sensor data, such as gyroscope sensor data, for example by integrating gyroscope sensor data, obtained from a gyroscope rigidly mounted to the camera.

(iii) Estimating global positions, i.e. the positions with respect to an inertial coordinate frame, of the camera 103 as the camera 103 captured each of said respective frames 110. In one embodiment, this can be achieved by solving a non-linear least-squares problem, using Levenberg-Marquardt. Algorithms that compute the global positions of the camera during image acquisition typically take the estimated relative positions and the estimated global orientations as input. Some embodiments of a global position estimation algorithm also require the list of features as an input.

(iv) Estimating 3D-positions of the landmarks corresponding to the features in the list of features (i.e. the respective landmarks which the features in the list of features are a projection of), and then creating a landmark map 106 based on said estimated 3-D positions. In one embodiment, this can be achieved using a triangulation algorithm, such as direct-linear-transform triangulation. The triangulation algorithm determines a landmark map 106 which comprises landmark representations and identifiers associated with them, using: the global orientations estimated in step (ii), the global positions estimated in step (iii), the list of features, and the camera parameters.

It should be understood that the above-mentioned steps (i)-(iv) are carried out subsequently, yielding a landmark map 106. Thus, the output of the reconstruction initialization step is a landmark map 106. The global orientations of the camera 103 as the camera 103 captured each of said respective frames 110, and the global positions of the camera 103 as the camera 103 captured each of said respective frames 110, will hereinafter be referred to as the estimated poses of the camera 103, or estimate of camera poses which the camera 103 occupied as the camera 103 captured each of said respective frames 110

Note that in each of the above steps, outlier filtering can be performed on the list of features. That is, if, by some metric of probability, two features in two distinct images in the list of features that have the same identifier are deemed to be the projections of different landmarks, the list of features can be modified accordingly, e.g. by removing both of said two features.

Initial Bundle Adjustment Step 802:

After the reconstruction initialization step has been carried out an initial bundle adjustment step is carried out using the list of features, the estimated poses of the camera 103, the landmark map 106, and the camera parameters, in which the global orientations estimated in step (ii), and the global positions estimated in step (iii), and the landmark map 106 are optimized. In some embodiments, the initial bundle adjustment step further includes a step of optimizing the camera parameters.

In the present invention the initial bundle adjustment step may comprise any suitable, known, bundle adjustment method; such as, for example, the bundle adjustment method described in the publication "A Modern Synthesis" (1999), by Bill Triggs, Philip F. Mcauchlan, Richard I. Hartley, Andrew W. Fitzgibbon.

Merging Step 803:

The following is a description of an exemplary landmark representation merging step which is carried out after the above-mentioned reconstruction initialization step and initial bundle adjustment step:

From the landmark map 106, which is output after carrying out structure-from-motion, containing M landmark representations, $L_1, L_2, \ldots, L_M$ (which represent respective M landmarks), a metric of the probability that any two landmark representations $L_j, L_k, j \in \{1, 2, \ldots, M\}, k \in \{1, 2, \ldots, M\}$, are representations of the same landmark whose projections were assigned different identifiers can be computed:

$$p(L_j, L_k).$$

In an example embodiment, this probability is dependent on the Euclidean distance between the two landmark representations in the landmark map, such as $$p(L_j, L_k) = \begin{cases} 1, & \|L_k - L_j\| < \beta \\ 0, & \|L_k - L_j\| \geq \beta \end{cases}$$

where $\beta$ is a certain predefined threshold.

In other words if the distance between two landmark representations in the landmark map 106 is below a predefined threshold distance then the probability is one that the both landmark representations are representations of the same landmark, and therefore both of said landmark representations should be assigned the same identifier; (conversely, if the distance between two landmark representations in the landmark map is above a predefined threshold distance then the probability is zero that the both landmarks representations are representations of different landmarks, and therefore said two landmark representations should be assigned different identifiers). If this probability exceeds a certain threshold $\gamma$, all landmark representations with either of the two identifiers are assigned a single identifier.

Said single identifier can either be a new identifier which has not been assigned to any other landmark representation in the landmark map or can be one of the two identifiers which was assigned to either of said two landmark representations. Most preferably the single identifier is the identifier with the lowest value between the two identifiers—e.g. if one identifier is '1' and the other is '4' then both landmark representations are assigned the identifier '1' since this is the lowest value between the two identifier values. In this way, landmark representations in the landmark map 106 which are deemed to be the same landmark are merged.

Furthermore, the list of features is updated when any two landmark representations are considered, based on the metric of probability, to be representations of the same landmark.

As mentioned the list of features contains, image numbers which denote each of the captured frames; for each respective image number the identifiers which denote the features which were in the image belonging to that captured frame; and for each identifier the coordinates which represent the location of the identifier in that image (i.e. the location of the feature in the image); and the identifier associated with a landmark representation appearing in the landmark map 106 is the same as the identifier which was assigned to the feature in the list of features which gave rise to said landmark representation in the landmark map 106 upon carrying out structure-from-motion. When the identifier of a landmark representation in the landmark map is changed, the identifier of the corresponding identifier in the list of features is changed to have the same identifier as the landmark representation to provide an updated list of features.

For example, consider a first landmark map 106 having a landmark representation with identifier '1' and a landmark representation with identifier '4'; if the landmark representation with identifier '1' and the landmark representation with identifier '4', are located at a distance which is less than a predefined threshold distance apart then the metric of probability will be above a predefined threshold probability, indicating that these two landmark representations are representations of the same landmark. Accordingly, in this example, the identifier '4' which is assigned to one of said landmark representations is changed to be '1'. In order to update the list of features all the identifier entries in the list of features which are '4' are changed to '1'.

Hereinafter, we will use the terms "merging step" and "landmark representation merging" interchangeably.

Bundle Adjustment Step 804:

After the above-mentioned merging step has been carried out a bundle adjustment step is carried out using the updated list of features, the estimated poses of the camera 103, the landmark map 106, and the camera parameters to provide an updated landmark map, and an updated estimate of the poses of the camera during image acquisition. In some embodiments, the bundle adjustment step further includes a step of optimizing the camera parameters. In the present invention the bundle adjustment step may comprises any suitable, known, bundle adjustment method; such as the bundle adjustment method described in the publication "A Modern Synthesis" (1999), by Bill Triggs, Philip F. McLauchlan, Richard I. Hartley, Andrew W. Fitzgibbon.

Termination Criterion 805:

An example termination criterion may be that no two landmark representations within the landmark map result in a probability metric which is above the predefined threshold probability. Thus, the above-mentioned merging step and bundle adjustment step are repeated until there are no two landmark representations within the landmark map which result in a probability metric which is above the predefined threshold probability. For example these steps are repeated until no two landmark representation in the landmark map are located within a Euclidean distance of one another which is below the predefined threshold distance (it should be understood that different metrics, besides 'Euclidean distance between landmark representations' could alternatively be used).

In another embodiment, the termination criterion is based on a counter such that steps 803 and 804 are only repeated a predefined number of times. In another embodiment, the termination criterion is based on the change of the number of landmark representations within the landmark map: e.g. if the number of landmark representations within the landmark map has not changed during a predefined number of iterations (number of times that steps 803 and 804 are repeatedly carried out), the termination criterion is fulfilled.

Thus the output of structure-from-motion followed by repeated landmark representation merging and bundle adjustment is a landmark map 106 containing M landmark representations, $L_1, L_2, \ldots, L_M$ (which represent respective M landmarks), each representation having a respective identifier associated with it, and an estimate of camera poses which the camera 103 occupied as the camera 103 captured each of said respective frames 110. Importantly, the identifier associated with a landmark representation appearing in the landmark map is the same as the identifier which was assigned to the feature in the list of features which gave rise to said landmark representations representation in the landmark map upon carrying out structure-from-motion followed by repeated landmark representation merging and bundle adjustment. In some embodiments, the modified camera parameters are also an output of structure-from-motion followed by repeated landmark representation merging and bundle adjustment.

In some embodiments, when additional frames comprising images of the environment containing the landmarks are captured, by the camera 103 of the localizing apparatus 109 as it navigates through the environment, the information present in the images in said additional captured frames can be used to update the most recently created landmark map 106 (i.e. the landmark map 106 which is output from above described structure-from-motion followed by repeated landmark representation merging and bundle adjustment), to provide an updated landmark map. In one embodiment, the following steps are taken to provide an updated landmark map using said images belonging to said additional captured frames:

1. From each respective additional image belonging to each respective additional captured frame, extract features using the feature extraction module 104 to provide a list of feature descriptions 111 for every respective additional image belonging to each respective additional captured frame, providing a plurality of list of feature descriptions. Namely, one list of feature descriptions 111 for every respective additional image belonging to each respective additional captured frame.
2. The feature-to-landmark matching module 105 uses each of said list of feature descriptions 111 in said plurality of list of feature descriptions, and the most recently created landmark map 106, to compute for each feature in each of said list of feature descriptions 111 in said plurality of list of feature descriptions whether that feature is an inlier feature, and if so, which is the associated landmark from said most recently created landmark map 106. All outlier features are removed from each of said list of feature descriptions 111 in said plurality of list of feature descriptions, and a respective identifier is added to each respective inlier feature, where each respective identifier is the identifier of the landmark from said most recently created landmark map associated with said inlier feature, so as to provide an updated list of feature descriptions for each list of feature descriptions 111 in said plurality of list of feature description, yielding a plurality of updated list of feature descriptions.
3. For each additional captured frame, compute an estimate of the pose which the camera occupied during capturing of that frame. In one embodiment, this is done using the 3D pose estimation module 107, using the updated list of feature descriptions, i.e. the updated list of feature descriptions in said plurality of updated list of feature descriptions belonging to that frame, and said most recently created landmark map 106.
4. Using a model of the camera 103 that captured said additional frames, e.g. a pinhole camera model, compute measurement residuals for every image belonging to each respective captured additional frame, and every feature in the updated list of feature descriptions belonging to that image, according to the formula:

$$r_{k,i} = f(x_k, \theta, L_i) - c_{k,i}$$

where f denotes the projection function that projects landmark $L_i$ on to the image sensor of the camera during capturing of frame k, given an estimate of the pose of the camera during capturing of frame k, $x_k$, and the camera parameters $\theta$. The position of the feature associated with landmark $L_i$ in image k is denoted as $c_{k,i}$.
5. Minimize said measurement residuals $r_{k,i}$ by jointly optimizing the estimate of the pose of the camera which the camera occupied during capturing of each respective additional frame, and landmark representations in the most recently created landmark map 106, in the following optimization problem:

$$(x^*, L^*) = \mathrm{argmin}_{x,L} \sum_{k,i} \alpha_{k,i} \|r_{k,i}\| + \sum_i w_i \|L_i - L_i^0\|$$

where $x=(x_1, x_2, \ldots, x_K)$, $L=(L_1, L_2, \ldots, L_I)$, where K is the number of additional captured frames (each of which comprises a respective image) and I is the number of landmarks in the most recently created landmark map, $\alpha_{k,i}$ is a residual weight (in an example embodiment, this is the inverse of the variance of the measurement $c_{k,i}$), $L^0=(L_1^0, L_2^0, \ldots, L_I^0)$, where $L_i^0$ is the landmark representation of landmark i in the most recently created landmark map, $w_i$ is a prior weight (in an example embodiment, this is the inverse of the variance of the landmark representation of landmark i in the most recently created landmark map), and $x^*=(x^*_1, x^*_2, \ldots, x^*_K)$, denotes the optimized estimate of the pose of the camera during capturing of each respective additional frame, and $L^*=(L^*_1, L^*_2, \ldots, L^*_I)$ denotes the optimized landmark representations, giving rise to the updated landmark map. Said optimization problem can be solved with any suitable means, such as trust region methods or line search methods. In one embodiment, the landmark representations in the most recently created landmark map $L^0$ are used to initialize the landmark representations L in the optimization.

In some embodiments, the optimization step described in 5) is modified to also optimize the camera parameters:

$$(x^*, L^*, \theta^*) = \mathrm{argmin}_{x,L,\theta} \sum_{k,i} \alpha_{k,i}\|r_{k,i}\| + \sum_i w_i \|L_i - L_i^0\|$$

In some embodiments, additional sensor data is used, in addition to the additional frames comprising images of the environment containing the landmarks, to further improve the accuracy and precision of the updated landmark map. Such sensor data may for example be air pressure sensor data, accelerometer data, gyroscope data, magnetometer data, optical flow sensor data, range finder data, radar data, thermometer data, ultra sound sensor data, microphone data, radio sensor data, and time-of-flight sensor data.

In one embodiment, accelerometer data obtained from an accelerometer rigidly attached to the camera may for example be used to further improve accuracy and precision of the updated landmark map as follows:

1. From each respective additional image of each respective additional captured frame, extract features using the feature extraction module 104 to provide a list of feature descriptions 111 for every respective additional image belonging to each respective additional captured frame, providing a plurality of lists of feature descriptions. Namely, one list of feature descriptions 111 for every respective additional image belonging to each respective additional captured frame.
2. The feature-to-landmark matching module 105 uses each of said list of feature descriptions 111 in said plurality of list of feature descriptions and the most recently created landmark map 106, to compute for each feature in each of said list of feature descriptions 111 in said plurality of list of feature descriptions whether that feature is an inlier feature, and if so, which is the associated landmark from said most recently created landmark map 106. All outlier features are removed from each of said the list of feature descriptions 111 in said plurality of list of feature descriptions, and a respective identifier is added to each inlier feature, where each respective identifier is the identifier of the landmark from said most recently created landmark map associated with said inlier feature, so as to provide an updated list of feature descriptions for each list of feature descriptions 111 in said plurality of list of feature description, yielding a plurality of updated list of feature descriptions.
3. For each additional captured frame, compute an estimate of the pose which the camera occupied during capturing of that frame. In one embodiment, this is done using the 3D pose estimation module 107, using the updated list of feature descriptions, i.e. the updated list of feature descriptions in said plurality of updated list of feature descriptions belonging to that frame, and said most recently created landmark map 106.
4. Using a model of the camera 103 that captured said additional frames, e.g. a pinhole camera model, compute measurement residuals for every image belonging to each respective captured additional frame, and every feature in the updated list of feature descriptions belonging to that image, according to the formula:

$$r_{k,i} = f(x_k, \theta, L_i) - c_{k,i}$$

where f denotes the projection function that projects landmark $L_i$ on to an image sensor of the camera during capturing of frame k, given an estimate of the pose of the camera during capturing of frame k, $x_k$, and the camera parameters $\theta$. The position of the feature associated with landmark $L_i$ in the image belonging to frame k is denoted as $c_{k,i}$. Additionally, compute the accelerometer measurement residuals:

$$r_k^a = R_{CA}^{-1} R_{k,IC}^{-1}(p_k + R_{k,IC}d)'' - R_{CA}^{-1}R_{k,IC}^{-1}g - a_k$$

where $R_{CA}$ denotes the orientation of coordinate frame A expressed in the camera coordinate frame C, $R_{k,IC}$ denotes the orientation of the camera during capturing of frame k expressed in the inertial coordinate frame I, $p_k$ denotes the position of the camera during capturing of frame k with respect to the inertial coordinate frame I, d denotes the position of the accelerometer with respect to the camera coordinate frame C, g denotes gravity with respect to the inertial coordinate frame I, and $a_k$ denotes the accelerometer sensor data during capturing of frame k in the accelerometer coordinate frame A, and $(\cdot)''$ denotes the second time derivative. Said second time derivative can be computed e.g. with numerical differentiation.

5. Minimize said measurement residuals $r_{k,i}$ and said accelerometer measurement residuals $r_k^a$ by jointly optimizing the estimate of the pose which the camera occupied during capturing of each respective additional frame, and the landmark representations in the most recently created landmark map 106, in the following optimization problem:

$$(x^*, L^*) = \mathrm{argmin}_{x,L} \sum_{k,i} (\alpha_{k,i}\|r_{k,i}\| + \beta_k \|r_k^a\|) + \sum_i w_i \|L_i - L_i^0\|$$

where $x=(x_1, x_2, \ldots, x_K)$, $L=(L_1, L_2, \ldots, L_I)$, where K is the number of additional frames captured and I is the number of landmarks in the most recently created landmark map, $\alpha_{k,i}$ is a residual weight (in an example embodiment, this is the inverse of the variance of the measurement $c_{k,i}$), $\beta_k$ is an accelerometer residual weight (in an example embodiment, this is the inverse of the variance of the accelerometer sensor data $a_k$), $L^0 = (L_1^0, L_2^0, \ldots, L_I^0)$, where $L_i^0$ is the landmark representation of landmark i in the most recently created landmark map, $w_i$ is a prior weight (in an example embodiment, this is the inverse of the variance of the landmark representation of landmark i in the most recently created landmark map), and $x^* = (x^*_1, x^*_2, \ldots, x^*_K)$ denotes the optimized estimate of the pose of the camera during capturing said additional frames and $L^* = (L^*_1, L^*_2, \ldots, L^*_I)$ denotes the optimized landmark representations, giving rise to the updated landmark map. Said optimization problem can be solved with any suitable means, such as trust region methods or line search methods. In one embodiment, the landmark representations in the most recently created landmark map $L^0$ are used to initialize the landmark representations L in the optimization.

The present invention may be practiced as a method or device adapted to practice the method. It is understood that the examples in this application are intended in an illustrative rather than in a limiting sense. In accordance with the present disclosure, limitations of current systems for localizing have been reduced or eliminated. While certain aspects of the present invention have been particularly shown and described with reference to exemplary embodiments thereof, it will be understood by those of ordinary skill in the art that various changes in form and details may be made therein without departing from the spirit and scope of the present invention as defined by the following claims. It will also be understood that the components of the present disclosure may comprise hardware components or a combination of hardware and software components. The hardware components may comprise any suitable tangible components that are structured or arranged to operate as described herein. Some of the hardware components may comprise processing circuitry (e.g., a processor or a group of processors) to perform the operations described herein. The software components may comprise code recorded on tangible computer-readable medium. The processing circuitry may be configured by the software components to perform the described operations. It is therefore desired that the present embodiments be considered in all respects as illustrative and not restrictive.

The invention claimed is:

1. A method of creating a landmark map, comprising the steps of:
   capturing a plurality of frames using a camera, each frame comprising an image;
   assigning an image number which denotes the order in which each said frame was captured;
   extracting from said plurality of frames a one or more features;
   carrying out a feature matching on said one or more features resulting in a list of features; and
   carrying out the structure-from-motion, followed by landmark representation merging and bundle adjustment a plurality of times, and using the list of features, to create a landmark map.

2. The method of claim 1, further comprising the steps of:
   extracting from a second image in the captured plurality of frames a second set of one or more features, wherein the frame comprising the first image was captured at a different time instant relative to a time instant when the frame comprising the second image was captured;
   assigning a distinct identifier to each feature in the first set of one or more features which was extracted from the first image;
   and then carrying out the following steps for each respective feature in the second set of one or more features:
   i. computing a distance between, the location in the second image of the respective feature, and the location in the first image of each feature in the first set of one or more features;
   ii. determining if said computed distance is less than, a predefined threshold distance;
   iii. if the computed distance is less than said predefined threshold distance then assign the respective feature the same identifier as is assigned to the said feature in first set of one or more features whose location in the first image was computed to be less than, or equal to, said predefined threshold distance;
   iv. if the computed distance is not less than the predefined threshold distance, then assign a new identifier to the respective feature;
   providing a list of features which comprises:
   a. image numbers that denote the first image and the second image;
   b. for each respective image number, the identifiers which denote the extracted features;
   c. for each identifier the coordinates which represent the location of the extracted feature in the respective image from which that features was extracted.

3. A method according to claim 1, wherein the landmark map contains M landmark representations, $L_1, L_2, \ldots, L_M$ which represent respective M landmarks, and each representation has a respective identifier associated with it, wherein the identifier associated with a landmark representation is the same as the identifier which was assigned to the feature in the list of features which gave rise to said landmark representation in the landmark map upon carrying out the structure-from-motion followed by repeated landmark representation merging and bundle adjustment.

4. A method according to claim 1, wherein structure-from-motion comprises a reconstruction initialization step in which the list of features and camera parameters of the camera and estimates of the poses of the camera are used to create the landmark map; and an initial bundle adjustment step in which the created landmark map, the estimates of the pose of the camera, and, optionally, the camera parameters are optimized.

5. A method according to claim 1, wherein the landmark representation merging comprises the steps of,
   determining if any two landmark representations in the landmark map are representations of the same landmarks; and
   if two landmark representations are determined to be representations of the same landmarks, changing the identifier assigned to at least one of said landmark representations so that both landmark representations are assigned the same identifier.

6. A method according to claim 5, wherein the landmark representation merging further comprises the step of,
   if the identifier of a landmark representation in the landmark map is changed, changing a corresponding identifier in the list of features to have the same identifier as the landmark representation to provide an updated list of features.

7. A method according to claim 6, wherein bundle adjustment is applied after landmark representation merging, using the updated list of features, the estimates of the poses of the camera, and the landmark map, to provide an updated landmark map.

8. A method according to claim 5 comprising, repeating the steps the following steps until no two landmark representations are determined to be representations of the same landmarks:
   a reconstruction initialization step in which the list of features and camera parameters of the camera and estimates of the poses of the camera are used to create the landmark map; and an initial bundle adjustment step in which the created landmark map, the estimates of the pose of the camera, and, optionally, the camera parameters are optimized;

determining if any two landmark representations in the landmark map are representations of the same landmarks.

9. A method according to claim 1 further comprising using additional frames comprising images of an environment containing the landmarks to update the landmark map to provide an updated landmark map.

10. A method according to claim 9 comprising forming a plurality of list of feature descriptions of the features in said images belonging to the additional captured frames;

for each feature description in each list of feature descriptions in said plurality of list of feature descriptions, whether the feature which that feature description corresponds to is an inlier feature or an outlier feature; removing all feature descriptions with correspond to outlier features, and add an identifier to each inlier feature, where the identifier is the identifier of the landmark from said landmark map associated with said inlier feature, so as to provide an updated list of feature descriptions for each list of feature descriptions in said plurality of list of feature descriptions, so as to provide an plurality of updated list of feature descriptions;

for each additional captured frame, compute an estimate of the pose of the camera occupied during capturing that frame;

using a model of the camera that captured said additional frames, compute measurement residuals for every image belonging to each respective captured additional frame, and every feature in every updated list of feature descriptions in said plurality of updated list of feature descriptions, according to the formula:

$$r_{k,i} = f(x_k, \theta, L_i) - c_{k,i}$$

where f denotes the projection function that projects landmark $L_i$ on to the image sensor of the camera during capturing of frame k, given an estimate of the pose of the camera during capturing of frame k, $x_k$, and the camera calibration parameters $\theta$, and wherein the position of a feature associated with landmark $L_i$ in the image belonging to frame k is denoted as $c_{k,i}$;

minimizing said measurement residuals $r_{k,i}$ by jointly optimizing the estimate of the pose of the camera during capturing of each additional frame, and landmark representations in the landmark map 106.

11. A method according to claim 10 comprising forming a plurality of list of feature descriptions of the features in said images belonging to the additional captured frames;

for each feature description in each list feature descriptions in said plurality of list of feature descriptions, whether the feature which that feature description corresponds to is an inlier feature or an outlier feature; removing all feature descriptions with correspond to outlier features, and add an identifier to each inlier feature, where the identifier is the identifier of the landmark from said landmark map associated with said inlier feature, so as to provide an updated list of feature descriptions for each list of feature descriptions in said plurality of list of feature descriptions, so as to provide an plurality of updated list of feature descriptions;

for each additional captured frame, compute an estimate of the pose of the camera occupied during capturing that frame;

using a model of the camera that captured said additional frames, compute measurement residuals for every image belonging to each respective captured additional frame, and every feature in said plurality of updated list of feature descriptions, according to the formula:

$$r_{k,i} = f(x_k, \theta, L_i) - c_{k,i}$$

where f denotes the projection function that projects landmark $L_i$ on to the image sensor of the camera during capturing of frame k, given an estimate of the pose of the camera during capturing of frame k, $x_k$, and the camera calibration parameters $\theta$, and wherein the position of a feature associated with landmark $L_i$ in the image belonging to frame k is denoted as $c_{k,i}$;

computing accelerometer measurement residuals, according to the formula:

$$r_k^a = R_{CA}^{-1} R_{k,IC}^{-1} (p_k + R_{k,IC} d)'' - R_{CA}^{-1} R_{k,IC}^{-1} g - a_k$$

where $R_{CA}$ denotes the orientation of coordinate frame A expressed in the camera coordinate frame C, $R_{k,IC}$ denotes the orientation of the camera during acquisition of image k expressed in the inertial coordinate frame I, $p_k$ denotes the position of the camera during acquisition of frame k with respect to the inertial coordinate frame I, d denotes the position of the accelerometer with respect to the camera coordinate frame C, g denotes gravity with respect to the inertial coordinate frame I, and $a_k$ denotes accelerometer sensor data during acquisition of frame k in the accelerometer coordinate frame A, and $(\cdot)''$ denotes the second time derivative;

minimizing said measurement residuals $r_{k,i}$ and said accelerometer measurement residuals $r_k^a$ by jointly optimizing the estimate of the pose of the camera during capturing of each additional frame, and the landmark representations.

12. A method according to claim 1, wherein the frame comprising the first image was captured at a time instant which is before a time instant when the frame comprising the second image was captured.

13. A method according to claim 1 further comprising the steps of, for each respective images in a plurality of images, carrying out the following steps extracting from a respective set of one or more features from said respective image to provide a set of extracted features for that respective image;

for each respective feature in the set of extracted features, carrying out the steps of, i. computing a distance between, the location in the respective image of the respective feature, and the location in another image of each feature which has been extracted from said other image, wherein identifier have already been assigned to features extracted from said other image;

ii. determining if said computed distance is greater than, equal to, or less than, a predefined threshold distance;

iii. if the computed distance is less than, or equal to, said predefined threshold distance then assign the respective feature the same identifier as is assigned to the said feature of said other image whose location in the first image was computed to be less than, or equal to, said predefined threshold distance;

iv. if the computed distance is greater than the predefined threshold distance, then assign a new identifier to the respective feature;

for each of said respective image in said plurality of images, providing a list of features which comprises:

i. image numbers that denote each of said respective images in said plurality of images;

ii. for each respective image number the identifiers which denote the features extracted from said respective image;

iii. for each identifier the coordinates which represent the location of the extracted feature in said respective image.

14. A method of creating a landmark map, comprising the steps of, capturing a plurality of frames using a camera, each frame comprising an image;

assigning an image number which denotes the order in which each frame was captured;

extracting from a first image in the captured plurality of frames a first set of one or more features;

extracting from a second image in the captured plurality of frames a second set of one or more features, wherein the frame comprising the first image was captured at a different time instant relative to a time instant when the frame comprising the second image was captured;

assigning a distinct identifier to each feature in the first set of one or more features which was extracted from the first image;

and then carrying out the following steps for each respective feature in the second set of one or more features:

i. computing a distance between, the location in the second image of the respective feature, and the location in the first image of each feature in the first set of one or more features;

ii. determining if said computed distance is less than, a predefined threshold distance;

iii. if the computed distance is less than said predefined threshold distance then assign the respective feature the same identifier as is assigned to the said feature in first set of one or more features whose location in the first image was computed to be less than, or equal to, said predefined threshold distance;

iv. if the computed distance is not less than the predefined threshold distance, then assign a new identifier to the respective feature;

providing a list of features which comprises:

a. image numbers that denote the first image and the second image;

b. for each respective image number, the identifiers which denote the extracted features;

c. for each identifier the coordinates which represent the location of the extracted feature in the respective image from which that features was extracted;

carrying out structure-from-motion, followed by landmark representation merging and bundle adjustment, using the list of features, to create a landmark map.

15. A method according to claim 14, wherein the landmark map contains M landmark representations, $L_1$, $L_2, \ldots, L_M$ which represent respective M landmarks, and each representation has a respective identifier associated with it, wherein the identifier associated with a landmark representation is the same as the identifier which was assigned to the feature in the list of features which gave rise to said landmark representation in the landmark map upon carrying out the structure-from-motion followed by repeated landmark representation merging and bundle adjustment.

16. A method according to claim 14 wherein the method comprises carrying out landmark representation merging and bundle adjustment a plurality of times, to create the landmark map.

17. A method according to claim 14, wherein structure-from-motion comprises a reconstruction initialization step in which the list of features and camera parameters of the camera and estimates of the poses of the camera are used to create the landmark map; and an initial bundle adjustment step in which the created landmark map, the estimates of the pose of the camera, and, optionally, the camera parameters are optimized.

18. A method according to claim 16 wherein the landmark representation merging comprises the steps of, determining if any two landmark representations in the landmark map are representations of the same landmarks; and if two landmark representations are determined to be representations of the same landmarks, changing the identifier assigned to at least one of said landmark representations so that both landmark representations are assigned the same identifier.

19. A method according to claim 18, wherein the landmark representation merging further comprises the step of, if the identifier of a landmark representation in the landmark map is changed, changing a corresponding identifier in the list of features to have the same identifier as the landmark representation to provide an updated list of features.

20. A method according to claim 19, wherein bundle adjustment is applied after landmark representation merging, using the updated list of features, the estimates of the poses of the camera, and the landmark map, to provide an updated landmark map.

21. A method according to claim 18 comprising, repeating the following steps until no two landmark representations are determined to be representations of the same landmarks:

a reconstruction initialization step in which the list of features and camera parameters of the camera and estimates of the poses of the camera are used to create the landmark map; and an initial bundle adjustment step in which the created landmark map, the estimates of the pose of the camera, and, optionally, the camera parameters are optimized;

determining if any two landmark representations in the landmark map are representations of the same landmarks.

22. A method according to claim 14 further comprising using additional frames comprising images of an environment containing the landmarks to update the landmark map to provide an updated landmark map.

23. A method according to claim 22 comprising forming a plurality of list of feature descriptions of the features in said images belonging to the additional captured frames;

for each feature description in each list of feature descriptions in said plurality of list of feature descriptions, whether the feature which that feature description corresponds to is an inlier feature or an outlier feature; removing all feature descriptions with correspond to outlier features, and add an identifier to each inlier feature, where the identifier is the identifier of the landmark from said landmark map associated with said inlier feature, so as to provide an updated list of feature descriptions for each list of feature descriptions in said plurality of list of feature descriptions, so as to provide an plurality of updated list of feature descriptions;

for each additional captured frame, compute an estimate of the pose of the camera occupied during capturing that frame;

using a model of the camera that captured said additional frames, compute measurement residuals for every image belonging to each respective captured additional frame, and every feature in every updated list of feature descriptions in said plurality of updated list of feature descriptions, according to the formula:

$$r_{k,i} = f(x_k, \theta, L_i) - c_{k,i}$$

where f denotes the projection function that projects landmark $L_i$ on to the image sensor of the camera during capturing of frame k, given an estimate of the pose of the camera during capturing of frame k, $x_k$, and the camera calibration parameters $\theta$, and wherein the position of a feature associated with landmark $L_i$ in the image belonging to frame k is denoted as $c_{k,i}$;

minimizing said measurement residuals $r_{x,i}$ by jointly optimizing the estimate of the pose of the camera during capturing of each additional frame, and landmark representations in the landmark map 106.

24. A method according to claim 22 comprising forming a plurality of list of feature descriptions of the features in said images belonging to the additional captured frames;

for each feature description in each list feature descriptions in said plurality of list of feature descriptions, whether the feature which that feature description corresponds to is an inlier feature or an outlier feature; removing all feature descriptions with correspond to outlier features, and add an identifier to each inlier feature, where the identifier is the identifier of the landmark from said landmark map associated with said inlier feature, so as to provide an updated list of feature descriptions for each list of feature descriptions in said plurality of list of feature descriptions, so as to provide an plurality of updated list of feature descriptions;

for each additional captured frame, compute an estimate of the pose of the camera occupied during capturing that frame;

using a model of the camera that captured said additional frames, compute measurement residuals for every image belonging to each respective captured additional frame, and every feature in said plurality of updated list of feature descriptions, according to the formula:

$$r_{k,i} = f(x_k, \theta, L_i) - c_{k,i}$$

where f denotes the projection function that projects landmark $L_i$ on to the image sensor of the camera during capturing of frame k, given an estimate of the pose of the camera during capturing of frame k, $x_k$, and the camera calibration parameters $\theta$, and wherein the position of a feature associated with landmark $L_i$ in the image belonging to frame k is denoted as $c_{k,i}$;

computing accelerometer measurement residuals, according to the formula:

$$r_k^a = R_{CA}^{-1} R_{k,IC}^{-1}(p_k + R_{k,IC}d)'' - R_{CA}^{-1} R_{k,IC}^{-1} g - a_k$$

where $R_{CA}$ denotes the orientation of coordinate frame A expressed in the camera coordinate frame C, $R_{k,IC}$ denotes the orientation of the camera during acquisition of image k expressed in the inertial coordinate frame I, $p_k$ denotes the position of the camera during acquisition of frame k with respect to the inertial coordinate frame I, d denotes the position of the accelerometer with respect to the camera coordinate frame C, g denotes gravity with respect to the inertial coordinate frame I, and $a_k$ denotes accelerometer sensor data during acquisition of frame k in the accelerometer coordinate frame A, and $(\cdot)''$ denotes the second time derivative;

minimizing said measurement residuals $r_{k,i}$ and said accelerometer measurement residuals $r_k^a$ by jointly optimizing the estimate of the pose of the camera during capturing of each additional frame, and the landmark representations.

25. A method according to claim 14, wherein the frame comprising the first image was captured at a time instant which is before a time instant when the frame comprising the second image was captured.

26. A method according to claim 14 further comprising the steps of, for each respective images in a plurality of images, carrying out the following steps extracting from a respective set of one or more features from said respective image to provide a set of extracted features for that respective image;

for each respective feature in the set of extracted features, carrying out the steps of,
i. computing a distance between, the location in the respective image of the respective feature, and the location in another image of each feature which has been extracted from said other image, wherein identifier have already been assigned to features extracted from said other image;
ii. determining if said computed distance is greater than, equal to, or less than, a predefined threshold distance;
iii. if the computed distance is less than, or equal to, said predefined threshold distance then assign the respective feature the same identifier as is assigned to the said feature of said other image whose location in the first image was computed to be less than, or equal to, said predefined threshold distance;
iv. if the computed distance is greater than the predefined threshold distance, then assign a new identifier to the respective feature;

for each of said respective image in said plurality of images, providing a list of features which comprises:
a. image numbers that denote each of said respective images in said plurality of images;
b. for each respective image number the identifiers which denote the features extracted from said respective image;
c. for each identifier the coordinates which represent the location of the extracted feature in said respective image.

27. A system for estimating the pose of a camera, the system comprising,
a plurality of physical landmarks each of which can reflect light;

a camera which can capture one or more frames each of which comprises a respective image of one or more physical landmarks, to provide one or more images which contain one or more features that correspond to the said physical landmarks;

one or more processors which are configured to carry out the method according to claim 1.

28. The system of claim 27 further comprising a light source.

29. A system for estimating the pose of a camera, the system comprising, a plurality of physical landmarks each of which can reflect light;

a camera which can capture one or more frames each of which comprises a respective image of one or more physical landmarks, to provide one or more images which contain one or more features that correspond to the said physical landmarks;

one or more processors which are configured to carry out the method according to claim 14.

* * * * *